US012675842B2

(12) United States Patent
Yang et al.

(10) Patent No.: US 12,675,842 B2
(45) Date of Patent: Jul. 7, 2026

(54) METHOD AND DEVICE FOR PERFORMING ARTIFICIAL INTELLIGENCE ENCODING AND ARTIFICIAL INTELLIGENCE DECODING

(71) Applicant: SAMSUNG ELECTRONICS CO., LTD., Suwon-si (KR)

(72) Inventors: Heechul Yang, Suwon-si (KR); Inhak Na, Suwon-si (KR); Hyunkwon Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 413 days.

(21) Appl. No.: 18/195,182

(22) Filed: May 9, 2023

(65) Prior Publication Data

US 2023/0281755 A1     Sep. 7, 2023

Related U.S. Application Data

(63) Continuation of application No. PCT/KR2021/016236, filed on Nov. 9, 2021.

(30) Foreign Application Priority Data

Nov. 9, 2020     (KR) ........................ 10-2020-0148914
Dec. 17, 2020    (KR) ........................ 10-2020-0177841

(51) Int. Cl.
    *G06T 3/4046*          (2024.01)
    *G06T 5/80*            (2024.01)
(52) U.S. Cl.
    CPC .............. *G06T 3/4046* (2013.01); *G06T 5/80* (2024.01); *G06T 2207/20024* (2013.01)
(58) Field of Classification Search
    CPC ..................... G06T 3/4046; G06T 5/80; G06T 2207/20024

(Continued)

(56) References Cited

U.S. PATENT DOCUMENTS 8,194,737 B2     6/2012   Nishi
8,577,165 B2     11/2013  Park
        (Continued)

FOREIGN PATENT DOCUMENTS

KR      10-2014-0098248 A      8/2014
KR      10-2014-0116992 A      10/2014
        (Continued)

OTHER PUBLICATIONS

Dong Liu et al., "Deep Learning-Based Video Coding: A Review and A Case Study", Apr. 29, 2019, 35 pages, XP081268317, arXiv:1904.12462v1 [cs.MM].
        (Continued)

*Primary Examiner* — Mark Roz
(74) *Attorney, Agent, or Firm* — Sughrue Mion, PLLC

(57)     ABSTRACT

An artificial intelligence (AI) encoding apparatus, including a memory configured to store instructions; and at least one processor configured to execute the instructions to: obtain an original image, previously-encoded frame information, and network environment information; obtain deblocking filter setting information, based on the original image, the previously-encoded frame information, and the network environment information; perform deblocking filtering to the original image, based on the deblocking filter setting information to obtain a deblocking-filtered original image; obtain an AI-downscaled first image by providing the deblocking-filtered original image a downscaling deep neural network (DNN); generate image data by performing first encoding on the AI-downscaled first image; and transmit the deblocking filter setting information, AI data including information related to the AI downscaling, and the image data.

9 Claims, 23 Drawing Sheets

(58) Field of Classification Search
USPC ........................................................ 382/100
See application file for complete search history.

(56) References Cited

U.S. PATENT DOCUMENTS

| | | | |
|---|---|---|---|
| 8,605,779 | B2 | 12/2013 | Qiu et al. |
| 8,805,105 | B2 | 8/2014 | Takamori et al. |
| 10,306,238 | B2 | 5/2019 | Topiwala et al. |
| 10,817,986 | B2 | 10/2020 | Park et al. |
| 10,817,990 | B1 | 10/2020 | Yang et al. |
| 10,825,140 | B1 | 11/2020 | Yang et al. |
| 11,166,027 | B2 | 11/2021 | Su et al. |
| 2008/0115185 | A1 | 5/2008 | Qiu et al. |
| 2012/0230604 | A1 | 9/2012 | Yamajo et al. |
| 2014/0286442 | A1 | 9/2014 | Kim et al. |
| 2017/0118468 | A1 | 4/2017 | Iwata et al. |
| 2017/0180740 | A1 | 6/2017 | Topiwala et al. |
| 2019/0339817 | A1 | 11/2019 | Kim et al. |
| 2020/0193647 | A1 | 6/2020 | Jeon et al. |
| 2020/0234469 | A1 | 7/2020 | Jeon et al. |
| 2022/0138904 | A1 | 5/2022 | Kim et al. |

FOREIGN PATENT DOCUMENTS

| | | | |
|---|---|---|---|
| KR | 10-2016-0011580 | A | 2/2016 |
| KR | 10-1611408 | B1 | 4/2016 |
| KR | 10-2020-0044653 | A | 4/2020 |
| KR | 10-2020-0044662 | A | 4/2020 |
| WO | 2018/005845 | A1 | 1/2018 |

OTHER PUBLICATIONS

Communication issued on Mar. 21, 2024 by the European Patent Office for European Patent Application No. 21889672.8.
International Search Report and Written Opinion dated Feb. 10, 2022, issued by the International Searching Authority in International Application No. PCT/KR2021/016236 (PCT/ISA/220, PCT/ISA/210, and PCT/ISA/237).

FIG. 5

| IMAGE-RELATED INFORMATION | DNN SETTING INFORMATION |
|---|---|
| SD, 10Mbps, AV1 | DNN SETTING INFORMATION A |
| HD, 15Mbps, H.264 | DNN SETTING INFORMATION B |
| Full HD, 20Mbps, HEVC | DNN SETTING INFORMATION C |
| Full HD, 15Mbps, HEVC | DNN SETTING INFORMATION D |

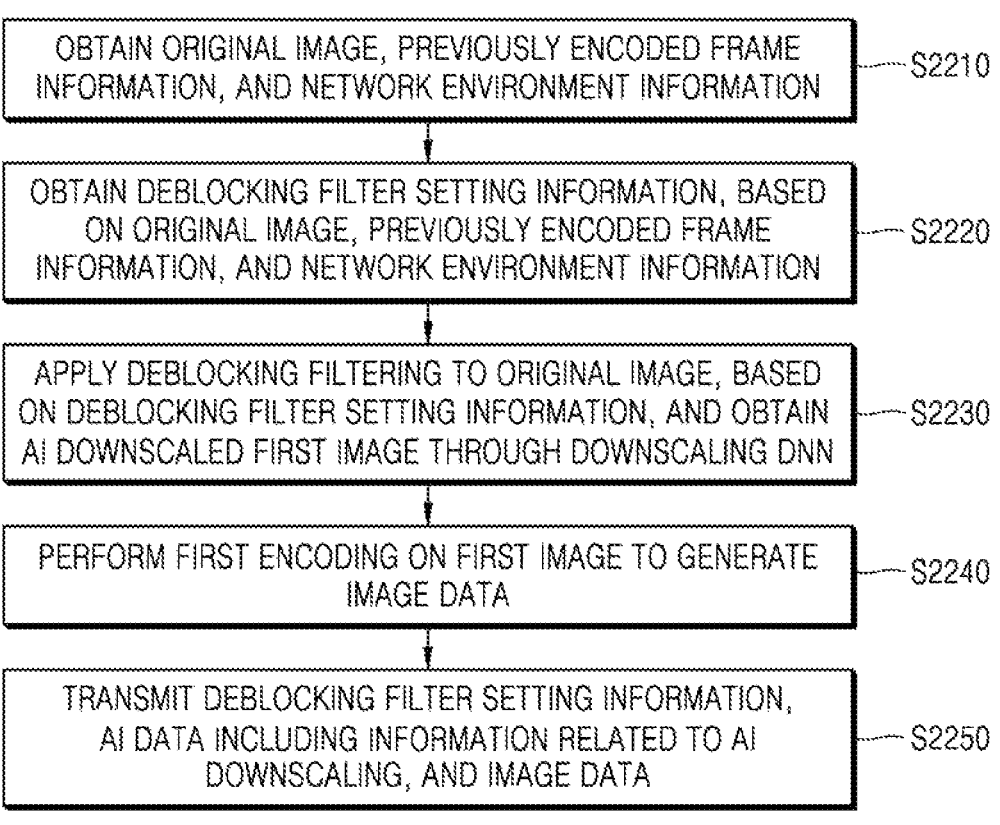

OBTAIN ORIGINAL IMAGE, PREVIOUSLY ENCODED FRAME INFORMATION, AND NETWORK ENVIRONMENT INFORMATION —— S2210

OBTAIN DEBLOCKING FILTER SETTING INFORMATION, BASED ON ORIGINAL IMAGE, PREVIOUSLY ENCODED FRAME INFORMATION, AND NETWORK ENVIRONMENT INFORMATION —— S2220

APPLY DEBLOCKING FILTERING TO ORIGINAL IMAGE, BASED ON DEBLOCKING FILTER SETTING INFORMATION, AND OBTAIN AI DOWNSCALED FIRST IMAGE THROUGH DOWNSCALING DNN —— S2230

PERFORM FIRST ENCODING ON FIRST IMAGE TO GENERATE IMAGE DATA —— S2240

TRANSMIT DEBLOCKING FILTER SETTING INFORMATION, AI DATA INCLUDING INFORMATION RELATED TO AI DOWNSCALING, AND IMAGE DATA —— S2250

FIG. 23

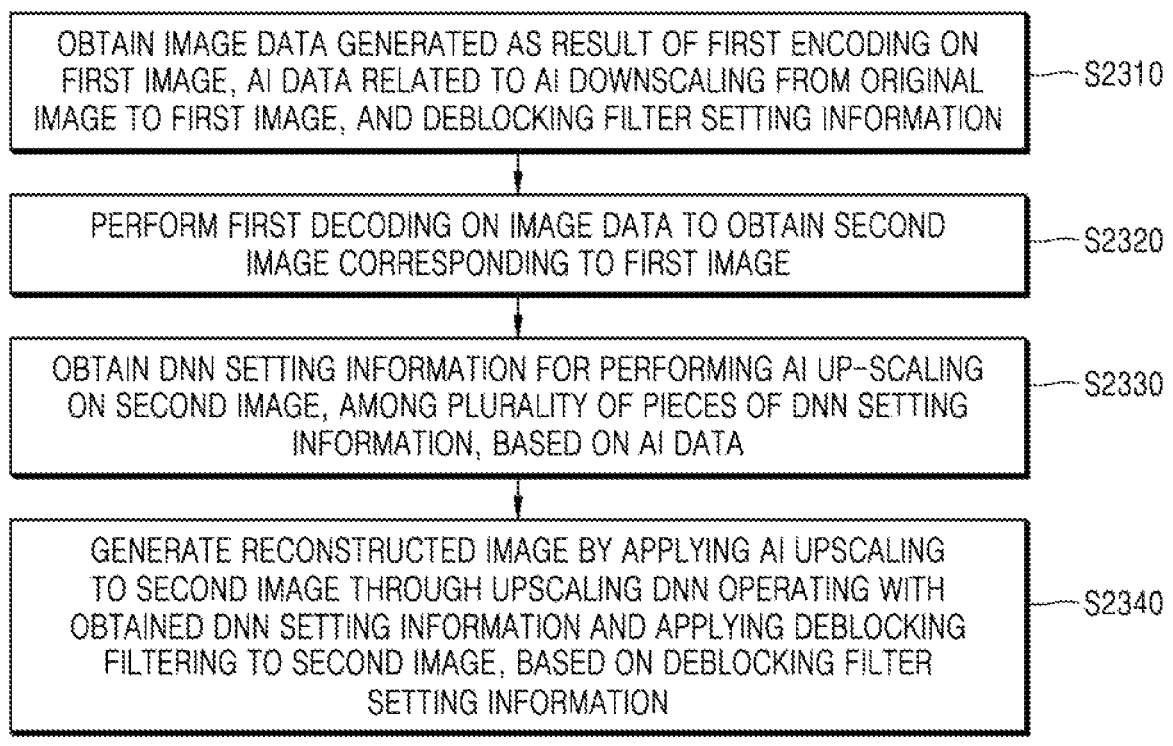

OBTAIN IMAGE DATA GENERATED AS RESULT OF FIRST ENCODING ON FIRST IMAGE, AI DATA RELATED TO AI DOWNSCALING FROM ORIGINAL IMAGE TO FIRST IMAGE, AND DEBLOCKING FILTER SETTING INFORMATION ——S2310

PERFORM FIRST DECODING ON IMAGE DATA TO OBTAIN SECOND IMAGE CORRESPONDING TO FIRST IMAGE ——S2320

OBTAIN DNN SETTING INFORMATION FOR PERFORMING AI UP-SCALING ON SECOND IMAGE, AMONG PLURALITY OF PIECES OF DNN SETTING INFORMATION, BASED ON AI DATA ——S2330

GENERATE RECONSTRUCTED IMAGE BY APPLYING AI UPSCALING TO SECOND IMAGE THROUGH UPSCALING DNN OPERATING WITH OBTAINED DNN SETTING INFORMATION AND APPLYING DEBLOCKING FILTERING TO SECOND IMAGE, BASED ON DEBLOCKING FILTER SETTING INFORMATION ——S2340

METHOD AND DEVICE FOR PERFORMING ARTIFICIAL INTELLIGENCE ENCODING AND ARTIFICIAL INTELLIGENCE DECODING

CROSS-REFERENCE TO RELATED APPLICATION

This application is a continuation application of International Application No. PCT/KR2021/016236, filed on Nov. 9, 2021, which is based on and claims priority to Korean Patent Application No. 10-2020-0148914, filed on Nov. 9, 2020, and Korean Patent Application No. 10-2020-0177841, filed on Dec. 17, 2020, in the Korean Intellectual Property Office, the disclosures of which are incorporated by reference herein in their entireties.

BACKGROUND

1. Field

The disclosure relates to a method and apparatus for processing an image, and more particularly, to a method and apparatus for performing artificial intelligence (AI) encoding and AI decoding.

2. Description of Related Art

Images may be encoded by a codec complying with a designated data compression standard, e.g., a moving picture expert group (MPEG) compression standard, and may then be stored in a recording medium or transmitted via a communication channel in the form of bitstreams.

As hardware for reproducing and storing high-resolution/high-quality images is being developed and supplied, a need for a codec capable of effectively encoding and decoding high-resolution/high-quality images is increasing.

SUMMARY

Provided are a method and apparatus for performing artificial intelligence (AI) encoding and AI decoding on an image, in which occurrence of a blocking artifact is predicted in a variable and limited network environment in a real-time streaming service to additionally perform deblocking filtering, and AI downscaling and AI upscaling are performed to encode and decode the image.

Additional aspects will be set forth in part in the description which follows and, in part, will be apparent from the description, or may be learned by practice of the presented embodiments.

In accordance with an aspect of the disclosure, an artificial intelligence (AI) encoding apparatus includes a memory configured to store instructions; and at least one processor configured to execute the instructions to: obtain an original image, previously-encoded frame information, and network environment information; obtain deblocking filter setting information, based on the original image, the previously-encoded frame information, and the network environment information; perform deblocking filtering to the original image, based on the deblocking filter setting information to obtain a deblocking-filtered original image; obtain an AI-downscaled first image by providing the deblocking-filtered original image a downscaling deep neural network (DNN); generate image data by performing first encoding on the AI-downscaled first image; and transmit the deblocking filter setting information, AI data including information related to the AI downscaling, and the image data.

In accordance with an aspect of the disclosure, an artificial intelligence (AI) decoding apparatus includes a memory configured to store instructions; and at least one processor configured to execute the instructions to: obtain image data generated based on first encoding performed on a first image, AI data related to AI downscaling from an original image to the first image, and deblocking filter setting information; obtain a second image corresponding to the first image by performing first decoding on the image data; obtain deep neural network (DNN) setting information for performing AI upscaling on the second image, from among a plurality of pieces of DNN setting information, based on the AI data; generate an AI-upscaled second image by applying the AI upscaling to the second image using an upscaling DNN operating based on the obtained DNN setting information; and generate a reconstructed image by applying blocking filtering to the AI-upscaled second image based on the deblocking filter setting information.

In accordance with an aspect of the disclosure, an artificial intelligence (AI) encoding method performed by an AI encoding apparatus includes obtaining an original image, previously-encoded frame information, and network environment information; obtaining deblocking filter setting information, based on the original image, the previously-encoded frame information, and the network environment information; applying deblocking filtering to the original image, based on the deblocking filter setting information, to obtain a deblocking-filtered original image; obtaining an AI-downscaled first image by providing the deblocking-filtered original image a downscaling deep neural network (DNN); generating image data by performing first encoding on the AI-downscaled first image; and transmitting the deblocking filter setting information, AI data including information related to the AI downscaling, and the image data.

During encoding, deblocking filter setting information may be obtained based on an original image, previous frame information, and network environment information, deblocking filtering may be applied to the original image, based on the deblocking filter setting information, and a deblocking-filtered original image is artificial intelligence (AI)-downscaled to transmit a downscaled image and the deblocking filter setting information. During decoding, the transmitted downscaled image may be AI upscaled to obtain an upscaled image, and deblocking filtering may be applied to the upscaled image, based on the transmitted deblocking filter setting information, to obtain a reconstructed image. Thus, even when network conditions suddenly change, high-resolution images may be effectively encoded and decoded based on AI.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table showing a mapping relationship between several pieces of image-related information and several pieces of DNN setting information, according to an embodiment;

FIG. 7 is a block diagram of a structure of an AI encoding apparatus according to an embodiment, according to an embodiment;

FIG. 13 is a diagram for describing an AI encoding process and an AI decoding process in which deblocking filtering is added, according to an embodiment;

FIG. 15 is a block diagram of a structure of an AI encoding apparatus according to an embodiment;

FIG. 16 is a diagram for describing an AI encoding process and an AI decoding process in which deblocking filtering is adaptively added, according to another embodiment;

FIG. 17 is a diagram for describing an AI encoding process and an AI decoding process in which deblocking filtering is adaptively added, according to another embodiment;

FIG. 18 is a diagram for describing an AI encoding process and an AI decoding process in which deblocking filtering is adaptively added, according to another embodiment;

FIG. 20 is a diagram for describing a method of training a third DNN 2010 and a fourth DNN 2020, according to an embodiment;

FIG. 22 is a flowchart of an AI encoding method according to an embodiment, according to an embodiment; and FIG. 23 is a flowchart of an AI decoding method according to an embodiment.

DETAILED DESCRIPTION

Figure 1:
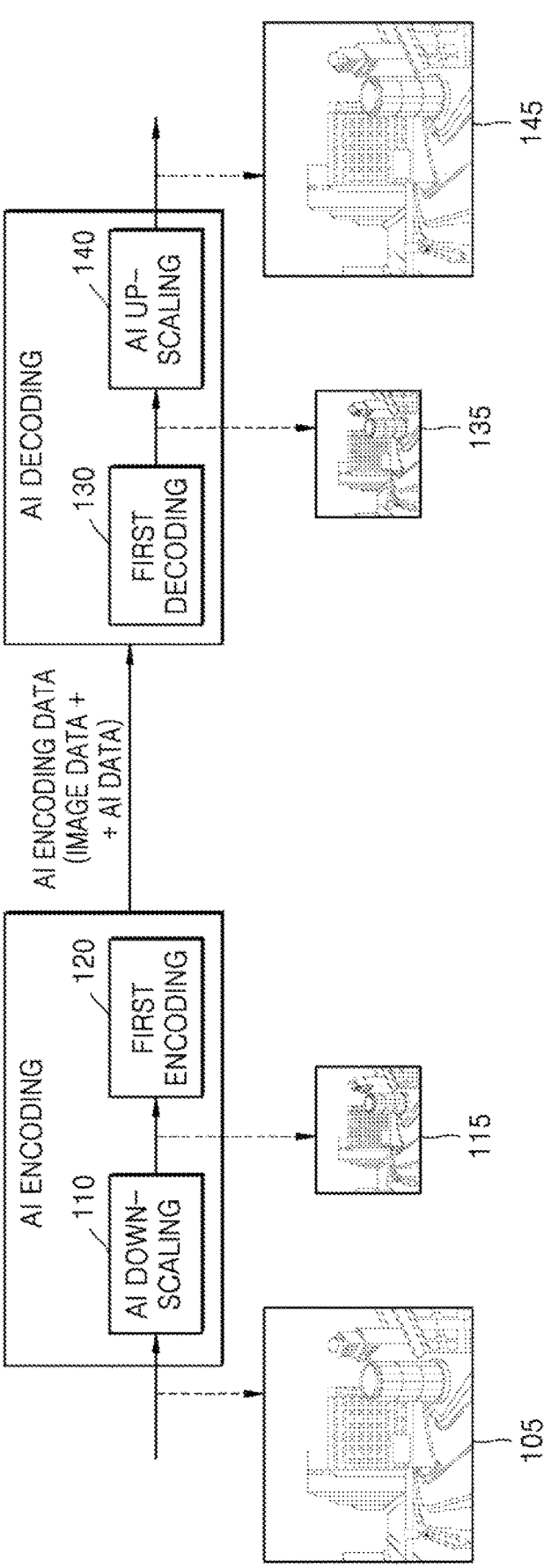
FIG. 1 is a diagram for describing an artificial intelligence (AI) encoding process and an AI decoding process, according to an embodiment.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments, certain detailed explanations may be omitted when it is deemed that they may unnecessarily obscure the description. While terms such as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' or a 'picture' may indicate a still image, a moving picture composed of a plurality of continuous still images (or frames), or a video.

A 'deep neural network (DNN)' is a representative example of an artificial neural network model simulating a brain nerve, and is not limited to an artificial neural network model using a specific algorithm.

A 'parameter', which is a value used in a computation process of each layer constituting a neural network, may include a weight used when an input value is applied to a certain operation expression. Here, the parameter may be expressed in a matrix form. The parameter, which is a value set as a result of training, may be updated through separate training data according to need.

A 'first DNN' indicates a DNN used for artificial intelligence (AI) down-scaling an image, and a 'second DNN' indicates a DNN used for AI up-scaling an image.

'IDNN setting information' includes information related to an element constituting a DNN. The first DNN or the second DNN may be set by using the DNN setting information.

An 'original image' denotes an image to be an object of AI encoding, and a 'first image' denotes an image obtained as a result of performing AI down-scaling on the original image during an AI encoding process. A 'second image' denotes an image obtained via first decoding during an AI decoding process, and a 'third image' denotes an image obtained by AI up-scaling the second image during the AI decoding process.

'AI down-scaling' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scaling' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding 120 and the first decoding 130 are performed on the original image 105.

In particular, in FIG. 1, the first image 115 is obtained by performing the AI down-scaling 110 on the original image 105 and the first encoding 120 is performed on the first image 115, during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution and/or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding, and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 needs to be performed on the second image 135 according to the up-scaling target verified based on the AI data.

The AI for the AI down-scaling 110 and the AI for the AI up-scaling 140 may be embodied as a DNN. As will be described later with reference to FIG. 11, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target image quality and/or resolution based on the provided target information.

Regarding the first encoding 120 and the first decoding 130 of FIG. 1, an information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the first encoding 120 performed on the first image 115. For example, the image data may include prediction mode information, motion information, and information related to quantization parameters used during the first encoding 120. The image data may be generated according to a rule, for example, according to a syntax, of an image compression method used during the first encoding 120, among the image compression methods using frequency transformation, such as MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have a targeted resolution and/or image quality, based on the AI data.

The AI data may be transmitted together with the image data in the form of a bitstream. Alternatively, according to an embodiment, the AI data may be transmitted separately from the image data, in the form of a frame or a packet.

Alternatively, according to an embodiment, the AI data may be transmitted by being included in the image data.

The AI data and the image data may be transmitted through the same network or through different networks.

Figure 2:
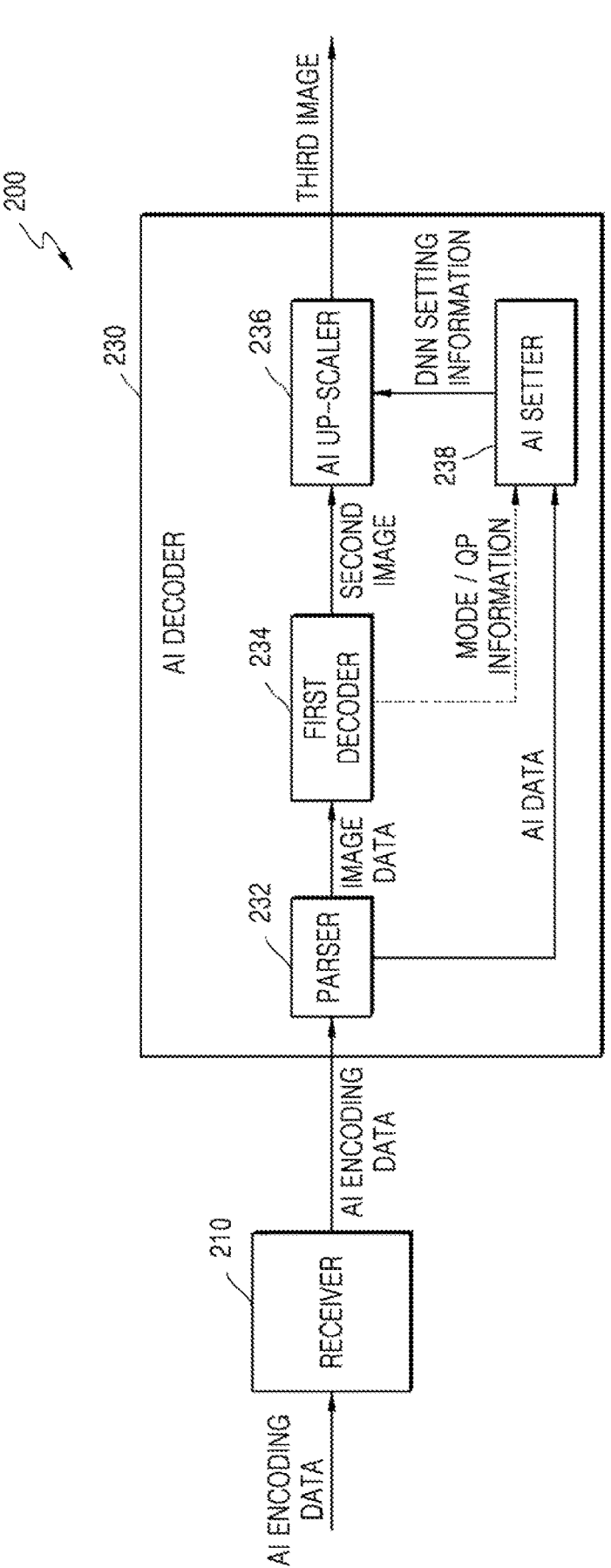
FIG. 2 is a block diagram of a structure of an AI decoding apparatus according to an embodiment.

FIG. 2 is a block diagram of a structure of an AI decoding apparatus 200 according to an embodiment.

Referring to FIG. 2, the AI decoding apparatus 200 according to an embodiment includes a receiver 210 and an AI decoder 230. The AI decoder 230 may include a parser 232, a first decoder 234, an AI up-scaler 236, and an AI setter 238.

Although the receiver 210 and the AI decoder 230 are illustrated as separate devices in FIG. 2, the receiver 210 and the AI decoder 230 may be implemented through one processor. In this case, the receiver 210 and the AI decoder 230 may be implemented as a dedicated processor, or may be implemented through a combination of software and a general-purpose processor such as an application processor (AP), a central processing unit (CPU), or a graphic processing unit (GPU). The dedicated processor may include a memory for implementing an embodiment of the disclosure or a memory processing unit for using an external memory.

The receiver 210 and the AI decoder 230 may be configured by a plurality of processors. In this case, the receiver 210 and the AI decoder 230 may be implemented as a combination of dedicated processors, or may be implemented through a combination of software and a plurality of general-purpose processors such as an AP, a CPU, or a GPU. According to an embodiment, the receiver 210 may be implemented as a first processor, the first decoder 234 may be implemented as a second processor different from the first processor, and the parser 232, the AI up-scaler 236, and the AI setter 238 may be implemented as a third processor different from the first processor and the second processor.

The receiver 210 receives the AI encoding data obtained as a result of the AI encoding. For example, the AI encoding data may be a video file having a file format such as mp4 or mov.

The receiver 210 may receive the AI encoding data transmitted through a network. The receiver 210 outputs the AI encoding data to the AI decoder 230.

According to an embodiment, the AI encoding data may be data obtained from a data storage medium including a magnetic medium (such as a hard disk, a floppy disk, or a magnetic tape), an optical recording medium (such as CD-ROM or DVD), or a magneto-optical medium (such as a floptical disk).

The parser 232 parses the AI encoding data, and transmits the image data generated as a result of the first encoding of the first image 115 to the first decoder 234 and transmits the AI data to the AI setter 238.

According to an embodiment, the parser 232 may parse the image data and the AI data separately included in the AI encoding data. The parser 232 may distinguish the image data and the AI data included in the AI encoding data, by reading a header within the AI encoding data. For example, the AI data may be included in a Vendor Specific InfoFrame (VSIF) in an HDMI stream.

The structure of the AI encoding data including the AI data and the image data separated from each other will be described later with reference to FIG. 9.

According to another embodiment, the parser 232 may parse the image data from the AI encoding data, extract the AI data from the image data, transmit the AI data to the AI setter 238, and transmit the remaining image data to the first decoder 234. In other words, the AI data may be included in the image data. For example, the AI data may be included in supplemental enhancement information (SEI), which is an additional information area of a bitstream corresponding to the image data. The structure of the AI encoding data including the image data including the AI data will be described later with reference to FIG. 10.

According to another embodiment, the parser 232 may split the bitstream corresponding to the image data into a bitstream to be processed by the first decoder 234 and a bitstream corresponding to the AI data, and may output the two bitstreams to the first decoder 234 and the AI setter 238, respectively.

The parser 232 may verify that the image data included in the AI encoding data is image data obtained via a certain codec (for example, MPEG-2, H.264 AVC, MPEG-4, HEVC, VC-1, VP8, VP9, or AV1). In this case, corresponding information may be transmitted to the first decoder 234 such that the image data is processed via the verified codec.

The first decoder 234 reconstructs the second image 135 corresponding to the first image 115, based on the image data received from the parser 232. The second image 135 obtained by the first decoder 234 is provided to the AI up-scaler 236.

According to an embodiment, first decoding related information, such as prediction mode information, motion information, quantization parameter information, or the like, may be provided by the first decoder 234 to the AI setter 238. The first decoding related information may be used to obtain DNN setting information.

The AI data provided to the AI setter 238 includes pieces of information enabling the second image 135 to be processed via AI up-scaling. Here, an up-scaling target of the second image 135 should correspond to a down-scaling target of a first DNN. Accordingly, the AI data needs to include information for verifying the down-scaling target of the first DNN.

Examples of the information included in the AI data include difference information between a resolution of the original image 105 and a resolution of the first image 115, and information related to the first image 115.

The difference information may be expressed as information about a resolution conversion degree of the first image 115 compared to the original image 105 (for example, resolution conversion rate information). Because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes, or as a ratio (16:9, 4:3, or the like) and a size of one axis. Also, when there is pre-set resolution information, the resolution information may be expressed in the form of an index or flag.

The information related to the first image 115 may include information about at least one of the resolution of the first image 115, a bitrate of the image data obtained as the result of performing first encoding on the first image 115, or a codec type used during the first encoding of the first image 115.

The AI setter 238 may determine the up-scaling target of the second image 135, based on at least one of the difference information or the information related to the first image 115, which are included in the AI data. The up-scaling target may indicate, for example, to what degree the resolution is to be up-scaled for the second image 135. When the up-scaling target is determined, the AI up-scaler 236 performs AI up-scaling on the second image 135 through a second DNN to obtain the third image 145 corresponding to the up-scaling target.

Before describing a method, performed by the AI setter 238, of determining the up-scaling target based on the AI data, an AI up-scaling process through the second DNN will be described with reference to FIGS. 3 and 4.

Figure 3:
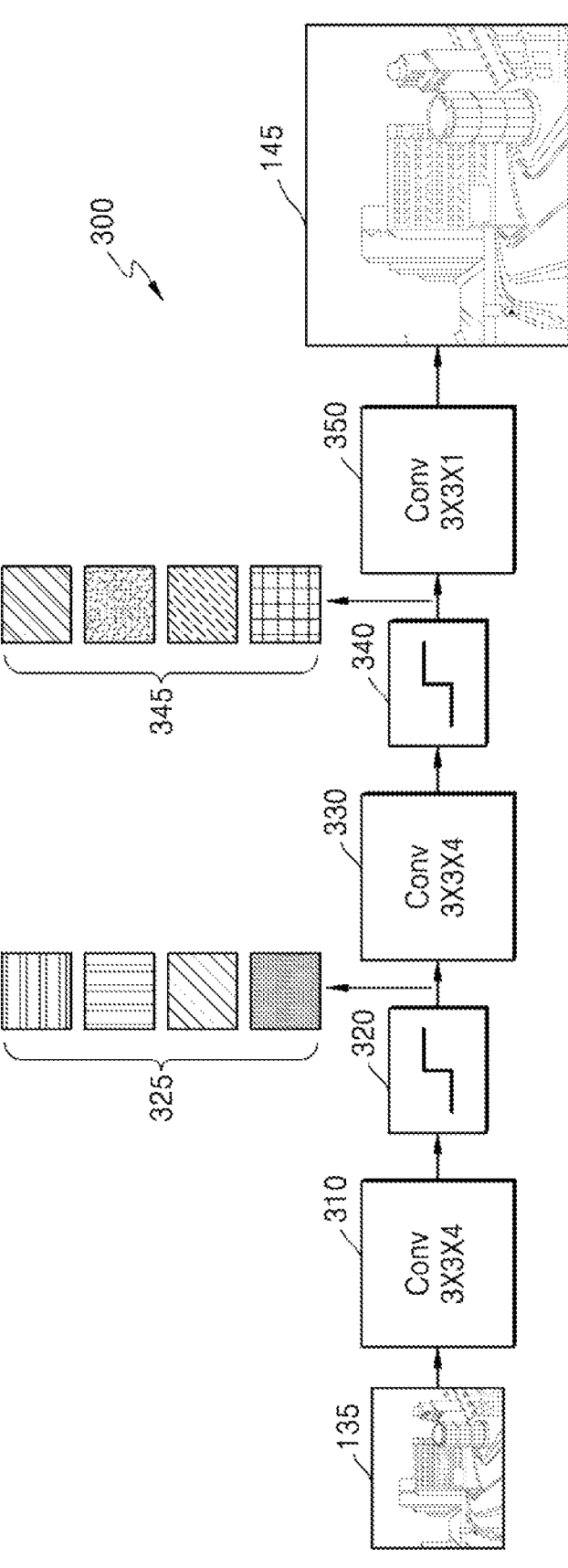
FIG. 3 is a diagram illustrating a second deep neural network (DNN) for AI upscaling of a second image, according to an embodiment.
Figure 4:
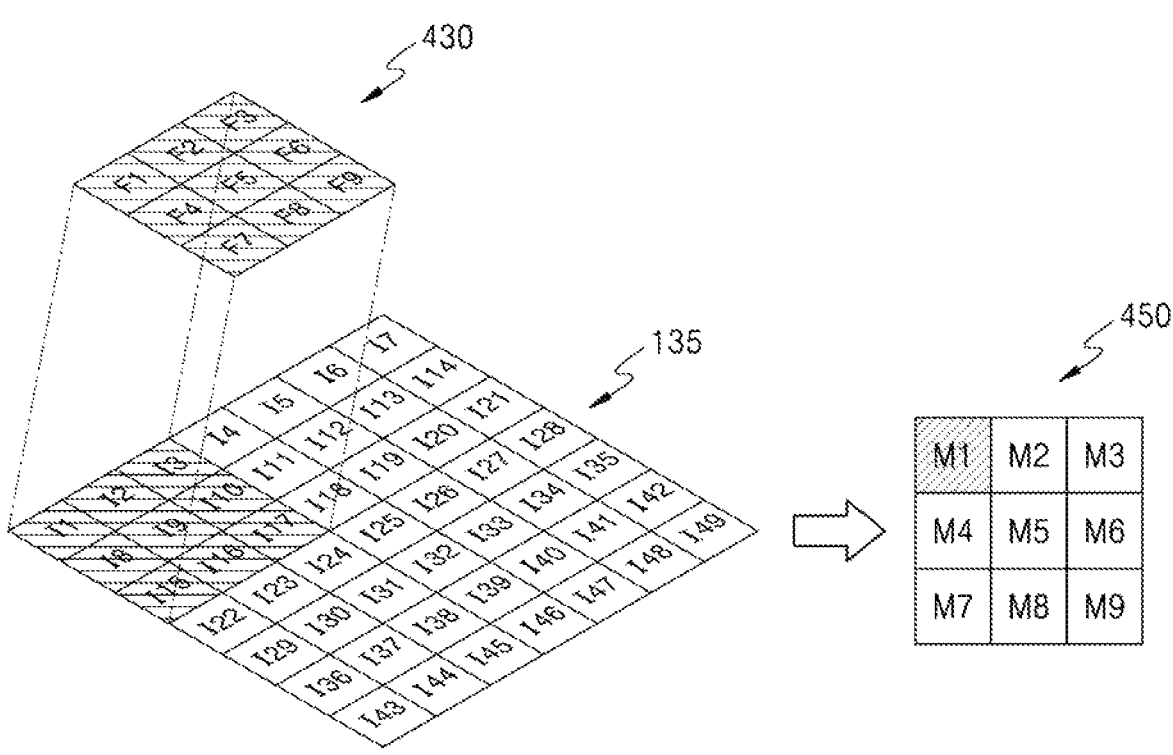
FIG. 4 is a view for explaining a convolution operation by a convolutional layer, according to an embodiment.

FIG. 3 is a diagram showing a second DNN 300 for performing AI up-scaling on the second image 135, and FIG. 4 is a diagram for describing a convolution operation in a first convolutional layer 310 of FIG. 3.

As shown in FIG. 3, the second image 135 is input to the first convolutional layer 310. The indication 3×3×4 marked on the first convolutional layer 310 of FIG. 3 indicates that convolution is performed on one image by using four filter kernels having a 3×3 size. Four feature maps are generated by the four filter kernels as a result of the convolution. Each feature map represents unique characteristics of the second image 135. For example, each feature map may represent the vertical direction characteristics, the horizontal direction characteristics, or the edge characteristics of the second image 135.

A convolution operation in the first convolutional layer 310 will be described below in detail with reference to FIG. 4.

A single feature map 450 may be generated through a multiplication operation and an addition operation between parameters of a filter kernel 430 having a size of 3×3 used in the first convolutional layer 310 and pixel values in the second image 135 corresponding to the parameters. Because the four filter kernels are used in the first convolutional layer 310, the four feature maps may be generated through a convolution operation process using the four filter kernels.

In FIG. 4, I1 through I49 displayed on the second image 135 represent the pixels of the second image 135, and F1 through F9 displayed on the filter kernel 430 represent the parameters of the filter kernel 430. M1 through M9 marked on the feature map 450 indicate samples of the feature map 450.

FIG. 4 illustrates inclusion of 49 pixels in the second image 135, but this is merely an example. When the second image 135 has a resolution of 4K, the second image 135 may include 3840×2160 pixels, for example.

In a convolution operation process, a multiplication operation between each of the pixel values of I1, I2, I3, I8, I9, I10, I15, I16, and I17 of the second image 135 and each of F1, F2, F3, F4, F5, F6, F7, F8 and F9 of the filter kernel 430 may be performed, and a value of a combination of result values of the multiplication operations (for example, an addition operation) may be allocated as the value of M1 of the feature map 450. When the stride of a convolution operation is 2, a multiplication operation between each of the pixel values of I3, I4, I5, I10, I11, I12, I17, I18, and I19 of the second image 135 and each of F1, F2, F3, F4, F5, F6, F7, F8 and F9 of the filter kernel 430 may be performed, and a value of a combination of result values of the multiplication operations may be allocated as the value of M2 of the feature map 450.

While the filter kernel 430 is moving according to the stride until reaching the last pixel of the second image 135, a convolution operation between the pixel values within the second image 135 and the parameters of the filter kernel 430 may be performed, and thus the feature map 450 having a certain size may be obtained.

According to the disclosure, values of the parameters of the first DNN, for example, the parameters of a filter kernel used in the convolutional layers of the second DNN (e.g., F1, F2, F3, F4, F5, F6, F7, F8 and F9 of the filter kernel 430), may be optimized through joint training of the first and second DNNs. The AI setter 238 may determine an up-scaling target corresponding to a down-scaling target of the first DNN, based on AI data, and determine parameters corresponding to the determined up-scaling target as the parameters of the filter kernel used in the convolutional layers of the second DNN.

The convolutional layers included in the first and second DNNs may be processed according to the convolution operation process described above with reference to FIG. 4, but the convolution operation process described above with reference to FIG. 4 is only an example. Embodiments are not limited thereto.

Referring back to FIG. 3, feature maps output by the first convolutional layer 310 are input to a first activation layer 320.

The first activation layer 320 may impart non-linear characteristics to each of the feature maps. The first activation layer 320 may include, but is not limited to, a sigmoid function, a Tanh function, a Rectified Linear Unit (ReLU) function, and the like.

The first activation layer 320 imparting non-linear characteristics refers to changing and outputting some sample values of the feature maps output by the first convolutional layer 310. This change is performed using the non-linear characteristics.

The first activation layer 320 determines whether to transmit the sample values of the feature maps output by the first convolutional layer 310 to a second convolutional layer 330. For example, some of the sample values of the feature maps are activated by the first activation layer 320 and transmitted to the second convolutional layer 330, and some sample values are not activated by the first activation layer 320 and not transmitted to the second convolutional layer 330. Unique characteristics of the second image 135 that are indicated by the feature maps are emphasized by the first activation layer 320.

Feature maps 325 output by the first activation layer 320 are input to the second convolutional layer 330. One of the feature maps 325 of FIG. 3 is a result obtained by processing the feature map 450 described above with reference to FIG. 4 in the first activation layer 320.

3×3×4 displayed on the second convolutional layer 330 illustrates that a convolution process is performed on the input feature maps 325 by using four filter kernels each having a 3×3 size. An output of the second convolutional layer 330 is input to a second activation layer 340. The second activation layer 340 may impart non-linear characteristics to input data.

Feature maps 345 output by the second activation layer 340 are input to a third convolutional layer 350. The indication 3×3×1 marked on the third convolutional layer 350 of FIG. 3 indicates that convolution is performed to generate one output image by using one filter kernel having a size of 3×3. The third convolutional layer 350, which is a layer for outputting a final image, generates one output by using one filter kernel. According to an embodiment of the disclosure, the third convolutional layer 350 may output the third image 145 through a convolution operation.

There may be a plurality of pieces of DNN setting information indicating the numbers of filter kernels of the first, second, and third convolutional layers 310, 330, and 350 of the second DNN 300, respective parameters of filter kernels of the first, second, and third convolutional layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

FIG. 3 illustrates the second DNN 300 including the three first, second, and third convolutional layers 310, 330, and 350 and the two first and second activation layers 320 and 340, but this is merely an example. In some cases, the number of convolutional layers and the number of activation layers may vary. In some cases, the second DNN 300 may be implemented as a recurrent neural network (RNN). This case refers to changing a CNN structure of the second DNN 300 according to an embodiment of the disclosure to an RNN structure.

According to an embodiment, the AI up-scaler 236 may include at least one arithmetic logic unit (ALU) for the above-described convolution operation and an operation of an activation layer. The ALU may be implemented as a processor. For the convolution operation, the ALU may include a multiplier that performs a multiplication operation between the sample values of the second image 135 or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tanh function, or ReLU function, and a comparator that compares a result of the multiplication with a predetermined value to determine whether to transmit the input sample value to the next layer.

A method, performed by the AI setter 238, of determining an up-scale target, and a method, performed by the AI up-scaler 236, of AI up-scaling the second image 135 according to the up-scaling target will now be described.

According to an embodiment, the AI setter 238 may store a plurality of pieces of DNN setting information settable in a second DNN.

Here, the DNN setting information may include information about at least one of the number of convolutional layers included in the second DNN, the number of filter kernels for each convolutional layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolutional layers based on any piece of DNN setting information, and may include four convolutional layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 238 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include pieces of information for obtaining the third image 145 of resolution twice higher than resolution of the second image 135, for example, the third image 145 of 4 K (4096×2160) twice higher than 2 K (2048×1080) of the second image 135, and another piece of DNN setting information may include pieces of information for obtaining the third image 145 of resolution four times higher than the resolution of the second image 135, for example, the third image 145 of 8 K (8192×4320) four times higher than 2 K (2048×1080) of the second image 135.

Each of the plurality of pieces of DNN setting information is obtained jointly with DNN setting information of the first DNN of an AI encoding apparatus 700, and the AI setter 238 obtains one piece of DNN setting information among the plurality of pieces of DNN setting information according to an enlargement ratio corresponding to a reduction ratio of the DNN setting information of the first DNN. To this end, the AI setter 238 may verify information of the first DNN. In order for the AI setter 238 to verify the information of the first DNN, the AI decoding apparatus 200 according to an embodiment receives AI data including the information of the first DNN from the AI encoding apparatus 700.

In other words, the AI setter 238 may verify information targeted by DNN setting information of the first DNN used to obtain the first image 115 and obtain the DNN setting information of the second DNN trained jointly with the DNN setting information of the first DNN, by using pieces of information received from the AI encoding apparatus 700.

When DNN setting information for performing the AI up-scaling on the second image 135 is obtained from among the plurality of pieces of DNN setting information, the obtained DNN setting information may be transmitted to the AI up-scaler 236, and input data may be processed based on the second DNN operating according to the obtained DNN setting information.

For example, when any one piece of DNN setting information is obtained, the AI up-scaler 236 may set the number of filter kernels included in each of the first, second, and third convolutional layers 310, 330, and 350 of the second DNN 300 of FIG. 3, and the respective parameters of the filter kernels to be values included in the obtained DNN setting information.

In detail, when parameters of a filter kernel of 3×3 used in any one convolutional layer of the second DNN of FIG. 4 are {1, 1, 1, 1, 1, 1, 1, 1, 1} and there is a change in DNN setting information, the AI up-scaler 236 may replace the parameters of the filter kernel with {2, 2, 2, 2, 2, 2, 2, 2, 2}, which are parameters included in the changed DNN setting information.

The AI setter 238 may obtain the DNN setting information for AI up-scaling the second image 135 from among the plurality of pieces of DNN setting information, based on information included in the AI data, and the AI data used to obtain the DNN setting information will now be described.

According to an embodiment, the AI setter 238 may obtain the DNN setting information for AI up-scaling the second image 135 from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI setter 238 may obtain the DNN setting information for increasing the resolution of the second image 135 two times.

According to another embodiment, the AI setter 238 may obtain the DNN setting information for AI up-scaling the second image 135 from among the plurality of pieces of DNN setting information, based on information related to the first image 115 included in the AI data. The AI setter 238 may pre-determine a mapping relationship between pieces of image-related information and pieces of DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change in resolution. As shown in FIG. 5, DNN setting information may be selected considering resolution (such as standard definition (SD), high definition (HD), or full HD), a bitrate (such as 10 Mbps, 15 Mbps, or 20 Mbps), and codec information (such as AV1, H.264, or HEVC), individually or collectively. For such consideration of the resolution, the bitrate and the codec information, training in consideration of each element should be jointly performed with encoding and decoding processes during an AI training process (see FIG. 11).

Accordingly, when a plurality of pieces of DNN setting information are provided based on image-related information including a codec type, resolution of an image, and the like, as shown in FIG. 5, according to training, the DNN setting information for AI up-scaling the second image 135 may be obtained based on the information related to the first image 115 received during the AI decoding process.

In other words, the AI setter 238 is capable of using DNN setting information according to image-related information, by matching the image-related information at the left of the table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI setter 238 may obtain A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed on the first image 115 via H.264 codec, the AI setter 238 may obtain B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed on the first image 115 via HEVC codec, the AI setter 238 may obtain C DNN setting information among the plurality of pieces of DNN setting information, and when it is verified that the resolution of the first image 115 is full HD, the bitrate of the image data obtained as the result of performing the first encoding is 15 Mbps, and the first encoding is performed on the first image 115 via HEVC codec, the AI setter 238 may obtain D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI setter 239 may obtain DNN setting information according to a bitrate of image data indicating the quality of the second image 135.

According to another embodiment, the AI setter 238 may obtain the DNN setting information for performing AI up-scaling on the second image 135 from among the plurality of pieces of DNN setting information by considering both information (prediction mode information, motion information, quantization parameter information, and the like) provided from the first decoder 234 and the information related to the first image 115 included in the AI data. For example, the AI setter 238 may receive quantization parameter information used during a first encoding process of the first image 115 from the first decoder 234, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 234 are/is considered together, compared to when only the AI data is used.

According to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI setter 238 may obtain the identifier of the DNN setting information included in the AI data and then obtain the DNN setting information corresponding to the identifier of the DNN setting information, and the AI up-scaler 236 may perform AI up-scaling on the second image 135 by using the DNN setting information corresponding to the identifier of the DNN setting information. For example, identifiers respectively indicating the plurality of pieces of DNN setting information settable in the first DNN and identifiers respectively indicating the plurality of pieces of DNN setting information settable in the second DNN may be previously designated. In this case, the same identifier may be designated for a pair of pieces of DNN setting information settable in each of the first DNN and the second DNN. The AI data may include an identifier of DNN setting information set in the first DNN for AI down-scaling of the original image 105. The AI setter 238 that receives the AI data may obtain the DNN setting information indicated by the identifier included in the AI data among the plurality of pieces of DNN setting information, and the AI up-scaler 236 may perform AI up-scaling on the second image 135 by using the DNN setting information indicated by the identifier included in the AI data.

Also, according to an embodiment, the AI data may include the DNN setting information. The AI setter 238 may obtain the DNN setting information included in the AI data, and the AI up-scaler 236 may perform AI up-scaling on the second image 135 by using the obtained DNN setting information.

According to an embodiment, when pieces of information (for example, the number of convolutional layers, the number of filter kernels for each convolutional layer, a parameter of each filter kernel, and the like) constituting the DNN setting information are stored in a form of a lookup table, the AI setter 235 may obtain the DNN setting information by combining some values selected from values in the lookup table, based on information included in the AI data, and the AI up-scaler 236 may perform AI up-scaling on the second image 135 by using the obtained DNN setting information.

According to an embodiment, when a structure of DNN corresponding to the up-scaling target is determined, the AI setter 238 may obtain the DNN setting information, for example, parameters of a filter kernel, corresponding to the determined structure of DNN.

As described above, the AI setter 238 obtains the DNN setting information of the second DNN through the AI data including information related to the first DNN, and the AI up-scaler 236 performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI setter 238 may independently obtain DNN setting information for a certain number of frames, or may obtain common DNN setting information for entire frames.

Figure 6:
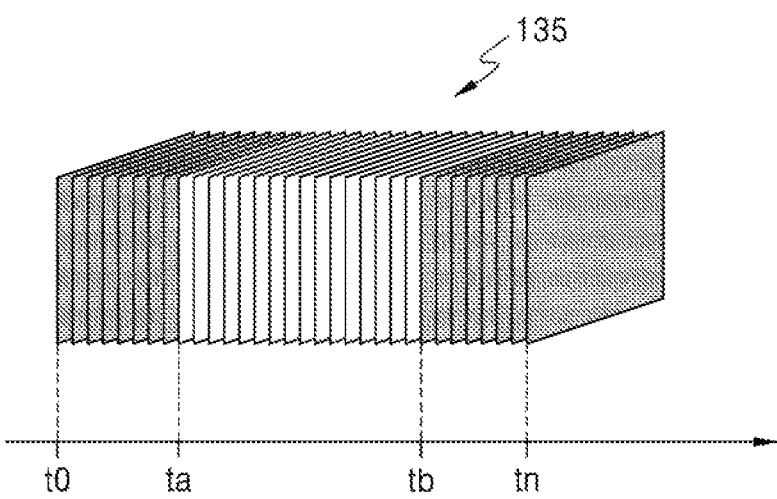
FIG. 6 is a diagram showing a second image including a plurality of frames, according to an embodiment.

FIG. 6 is a diagram showing the second image 135 including a plurality of frames.

As shown in FIG. 6, the second image 135 may include frames t0 through tn.

According to an embodiment, the AI setter 238 may obtain DNN setting information of a second DNN through AI data, and the AI up-scaler 236 may perform AI up-scaling on the frames t0 through tn based on the obtained DNN setting information. In other words, the frames t0 through tn may be processed via AI up-scaling based on common DNN setting information.

According to another embodiment, the AI setter 238 may obtain 'A' DNN setting information from AI data for some of the frames t0 through tn, for example, the frames t0 through ta, and may obtain 'B' DNN setting information from the AI data for the frames ta+1 through tb. Also, the AI setter 238 may obtain 'C' DNN setting information from the AI data for the frames tb+1 through tn. In other words, the AI setter 238 may independently obtain DNN setting information for each group including a certain number of frames among the plurality of frames, and the AI up-scaler 236 may perform AI up-scaling on frames included in each group by using the independently obtained DNN setting information.

According to another embodiment, the AI setter 238 may independently obtain DNN setting information for each frame forming the second image 135. For example, when the second image 135 includes three frames, the AI setter 238 may obtain DNN setting information in relation to a first frame, obtain DNN setting information in relation to a second frame, and obtain DNN setting information in relation to a third frame. In other words, DNN setting information may be independently obtained for each of the first frame, the second frame, and the third frame. DNN setting information may be independently obtained for each frame included in the second image 135, according to a method of obtaining DNN setting information based on information (prediction mode information, motion information, quantization parameter information, or the like) provided from the first decoder 234 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI setter 238 obtains DNN setting information based on the AI data, and the AI up-scaler 236 performs AI up-scaling on the frames t0 through ta by using the obtained DNN setting information. Also, when another piece of AI data includes information indicating that DNN setting information is valid up to the frame tn, the AI setter 238 may obtain DNN setting information based on the other piece of AI data, and the AI up-scaler 236 may perform AI up-scaling on the frames ta+1 through tn by using the obtained DNN setting information.

The AI encoding apparatus 700 for performing AI encoding on the original image 105 will be described with reference to FIG. 7.

Figure 7:
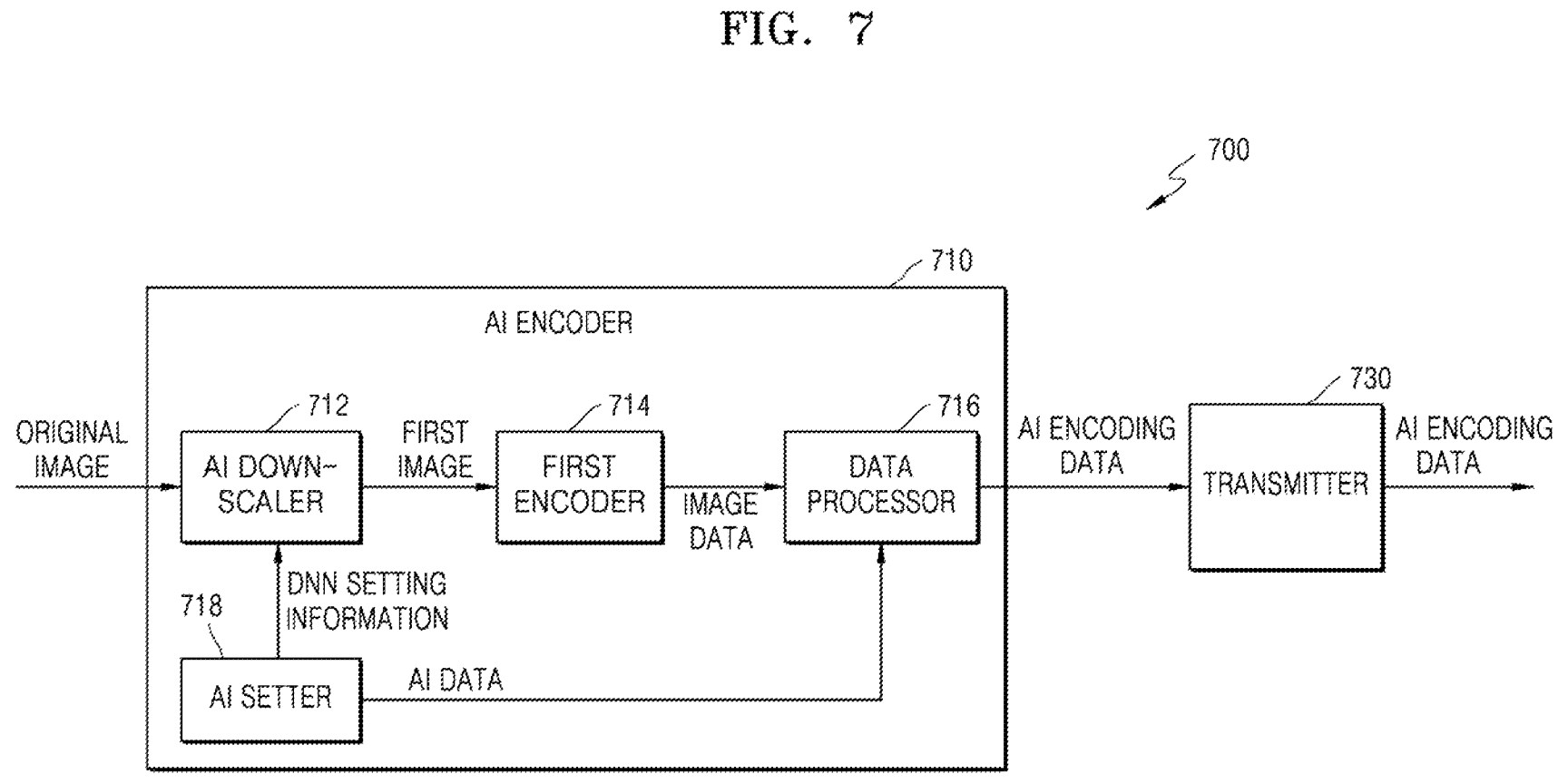

FIG. 7 is a block diagram of a structure of the AI encoding apparatus 700 according to an embodiment.

Referring to FIG. 7, the AI encoding apparatus 700 may include an AI encoder 710 and a transmitter 730. The AI encoder 710 may include an AI down-scaler 712, a first encoder 714, a data processor 716, and an AI setter 718.

In FIG. 7, the AI encoder 710 and the transmitter 730 are illustrated as separate devices, but the AI encoder 710 and the transmitter 730 may be implemented through one processor. In this case, the AI encoder 710 and the transmitter 730 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The AI encoder 710 and the transmitter 730 may be configured by a plurality of processors. In this case, the AI encoder 710 and the transmitter 730 may be implemented as a combination of dedicated processors, or may be implemented through a combination of software and a plurality of general-purpose processors such as an AP, a CPU, or a GPU.

According to an embodiment, the first encoder 714 may be implemented as a first processor, the AI down-scaler 712, the data processor 716, and the AI setter 718 may be implemented as a second processor different from the first processor, and the transmitter 730 may be implemented as a third processor different from the first processor and the second processor. The AI encoder 710 performs AI down-scaling on the original image 105 and first encoding on the first image 115, and transmits AI encoding data to the transmitter 730. The transmitter 730 transmits the AI encoding data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes pieces of information used during the first encoding performed on the first image 115. For example, the image data may include prediction mode information, motion information, and information related to quantization parameter used during the first encoding performed on the first image 115.

The AI data includes pieces of information enabling the AI up-scaler 236 to perform AI up-scaling on the second image 135 to an up-scaling target corresponding to a down-scaling target of a first DNN. For example, the AI data may include difference information between the original image 105 and the first image 115. For example, the AI data may include information related to the first image 115. The information related to the first image 115 may include information about at least one of resolution of the first image 115, a bitrate of the image data obtained as the result of performing first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 712 may obtain the first image 115 by performing the AI down-scaling on the original image 105 through the first DNN. The AI down-scaler 712 may perform the AI down-scaling on the original image 105 by using the DNN setting information provided by the AI setter 718. The AI setter 718 may determine the down-scaling target of the original image 105, based on a pre-determined standard.

In order to obtain the first image 115 matching the down-scaling target, the AI setter 718 may store a plurality of pieces of DNN setting information settable in the first DNN. The AI setter 718 obtains DNN setting information corresponding to the down-scaling target from among the plurality of pieces of DNN setting information, and provides the obtained DNN setting information to the AI down-scaler 712.

Each of the plurality of pieces of DNN setting information may be trained to obtain the first image 115 of pre-determined resolution and/or pre-determined quality. For example, any one piece of DNN setting information among the plurality of pieces of DNN setting information may include pieces of information for obtaining the first image 115 of a resolution that is half the resolution of the original image 105, for example, the first image 115 of 2 K (2048×1080) that is half 4 K (4096×2160) of the original image 105, and another piece of DNN setting information may include pieces of information for obtaining the first image 115 of a resolution that is quarter the resolution of the original image 105, for example, the first image 115 of 2 K (2048×1080) that is quarter 8 K (8192×4320) of the original image 105.

According to an embodiment, when pieces of information (for example, the number of convolutional layers, the number of filter kernels for each convolutional layer, a parameter of each filter kernel, and the like) constituting the DNN setting information are stored in a form of a lookup table, the AI setter 718 may provide, to the AI down-scaler 712, the DNN setting information obtained by combining some values selected from values in the lookup table, based on the down-scaling target.

According to an embodiment, the AI setter 718 may determine a structure of DNN corresponding to the down-scaling target, and may obtain the DNN setting information, for example, parameters of a filter kernel, corresponding to the determined structure of DNN.

The plurality of pieces of DNN setting information for performing the AI down-scaling on the original image 105 may have an optimized value as the first DNN and the second DNN are jointly trained. Here, each piece of DNN setting information includes at least one of the number of convolutional layers included in the first DNN, the number of filter kernels for each convolutional layer, or a parameter of each filter kernel.

The AI down-scaler 712 may set the first DNN with the DNN setting information determined to perform the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on pieces of information included in the DNN setting information.

A method, performed by the AI setter 718, of determining the down-scaling target will now be described. The down-scaling target may indicate, for example, by how much is resolution decreased from the original image 105 to obtain the first image 115.

The AI setter 718 obtains one or more pieces of input information. According to an embodiment, the input information may include at least one of a target resolution of the first image 115, a target bitrate of the image data, a bitrate type of the image data (e.g., a variable bitrate type, a constant bitrate type, or an average bitrate type), a color format (luminance component, chrominance component, red component, green component, blue component, or the like) to which AI downscaling is applied, a codec type for the first encoding of the first image 115, compression history information, and a resolution of the original image 105, or a type of the original image 105.

The one or more pieces of input information may include information previously stored in the AI encoding apparatus 700 or received from a user.

The AI setter 718 controls an operation of the AI down-scaler 712, based on the input information. According to an embodiment, the AI setter 718 may determine the down-scaling target according to the input information, and may provide DNN setting information corresponding to the determined down-scaling target to the AI down-scaler 712.

According to an embodiment, the AI setter 718 may transmit at least a portion of the input information to the first encoder 714 so that the first encoder 714 may perform first encoding on the first image 115 via a bitrate of a certain value, a bitrate of a certain type, and a certain codec.

According to an embodiment, the AI setter 718 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI setter 718 may determine the down-scaling target based on the compression ratio, the compression quality, or the like, which is pre-set or input from a user.

As another example, the AI setter 718 may determine the down-scaling target by using the compression history information stored in the AI encoding apparatus 700. For example, according to the compression history information usable by the AI encoding apparatus 700, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI setter 718 may determine the down-scaling target based on the encoding quality that has been used more frequently than a certain threshold value (for example, average quality of the encoding quality that has been used more frequently than the certain threshold value), according to the compression history information.

As another example, the AI setter 718 may determine the down-scaling target, based on the resolution, type (for example, a file format), or the like of the original image 105.

According to an embodiment, when the original image 105 includes a plurality of frames, the AI setter 718 may independently obtain DNN setting information for a certain number of frames, and may provide the independently-obtained DNN setting information to the AI down-scaler 712.

According to an embodiment, the AI setter 718 may divide the frames included in the original image 105 into a certain number of groups, and independently obtain the DNN setting information for each group. The same or different pieces of DNN setting information may be obtained for each group. The number of frames included in the groups may be the same or different according to each group.

According to another embodiment, the AI setter 718 may independently determine DNN setting information for each frame forming the original image 105. The same or different pieces of DNN setting information may be obtained for each frame.

An example of a structure of a first DNN 800 on which AI down-scaling is based will now be described.

Figure 8:
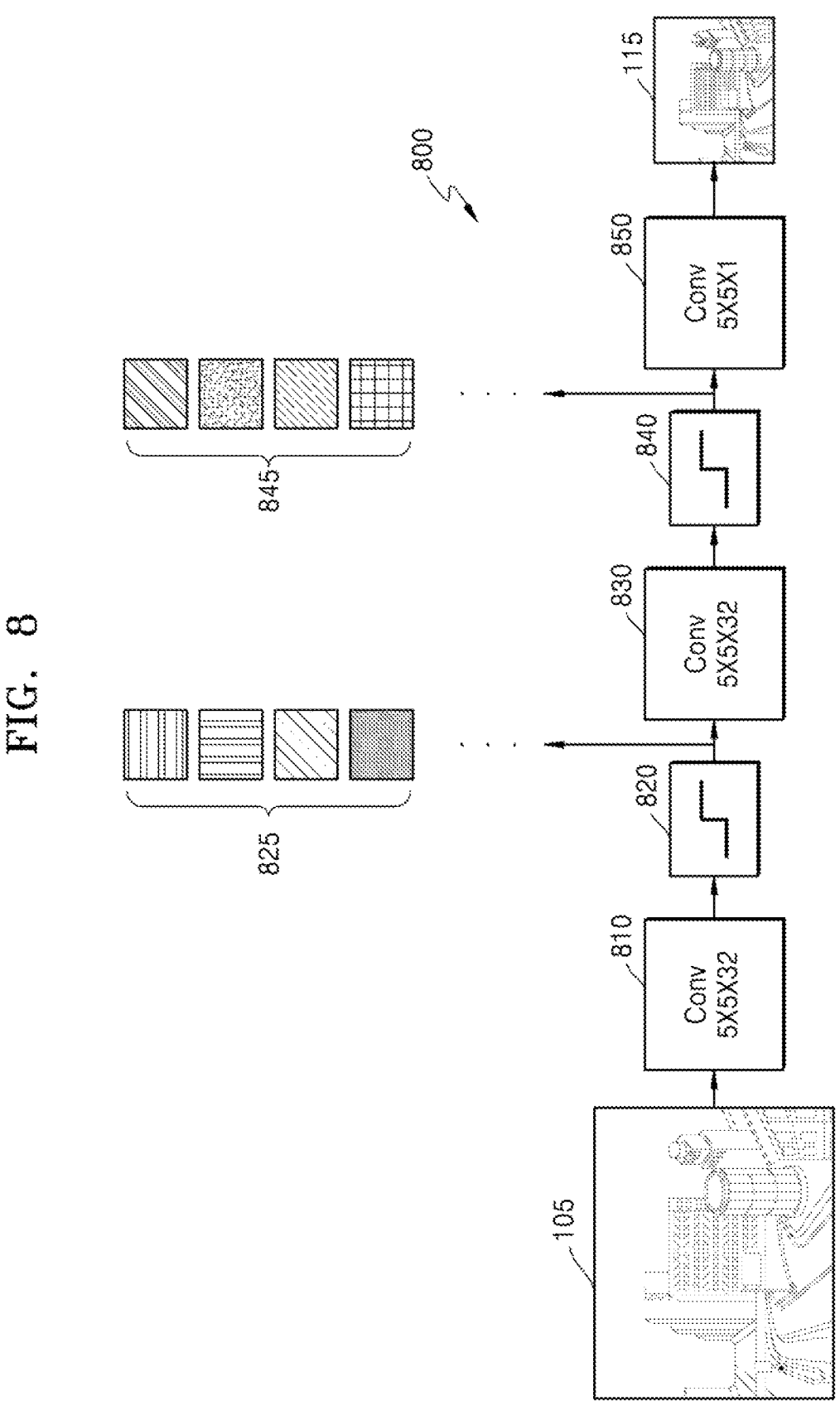
FIG. 8 is a diagram illustrating a first DNN for AI downscaling of an original image, according to an embodiment.

FIG. 8 is a diagram showing the first DNN 800 for performing AI down-scaling on the original image 105.

As shown in FIG. 8, the original image 105 is input to a first convolutional layer 810. The first convolutional layer 810 performs a convolution process on the original image 105 by using 32 filter kernels having a size of 5×5. 32 feature maps generated as a result of the convolution process are input to a first activation layer 820. The first activation layer 820 may impart non-linear characteristics to each of the 32 feature maps.

The first activation layer 820 determines whether to transmit the sample values of the feature maps output by the first convolutional layer 810 to a second convolutional layer 830. For example, some of the sample values of the feature maps are activated by the first activation layer 820 and transmitted to the second convolutional layer 830, and some sample values are not activated by the first activation layer 820 and not transmitted to the second convolutional layer 830. Information represented by the feature maps output from the first convolutional layer 810 is emphasized by the first activation layer 820.

An output 825 of the first activation layer 820 is input to the second convolutional layer 830. The second convolutional layer 830 performs a convolution process on input data by using 32 filter kernels having a size of 5×5. 32 feature maps output as a result of the convolution process are input to a second activation layer 840, and the second activation layer 840 may impart non-linear characteristics to each of the 32 feature maps.

An output 845 of the second activation layer 840 is input to a third convolutional layer 850. The third convolutional layer 850 performs a convolution process on the input data by using one filter kernel having a size of 5×5. As a result of the convolution process, one image may be output from the third convolutional layer 850. The third convolutional layer 850, which is a layer for outputting a final image, obtains one output by using one filter kernel. According to an embodiment of the disclosure, the third convolutional layer 850 may output the first image 115 through a convolution operation result.

There may be a plurality of pieces of DNN setting information indicating the numbers of filter kernels of the first, second, and third convolutional layers 810, 830, and 850 of the first DNN 800, respective parameters of filter kernels of the first, second, and third convolutional layers 810, 830, and 850 of the first DNN 800, and the like, and the plurality of pieces of DNN setting information should be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

FIG. 8 illustrates the first DNN 800 including the three first, second, and third convolutional layers 810, 830, and 850 and the two first and second activation layers 820 and 840, but this is merely an example. In some cases, the number of convolutional layers and the number of activation layers may vary. In some cases, the first DNN 800 may be implemented as an RNN. This case refers to changing a CNN structure of the first DNN 800 according to an embodiment of the disclosure to an RNN structure.

According to an embodiment, the AI down-scaler 712 may include at least one ALU for a convolution operation and an operation of an activation layer. The ALU may be implemented as a processor. For the convolution operation, the ALU may include a multiplier that performs a multiplication operation between the sample values of the original image 105 or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tanh function, or ReLU function, and a comparator that compares a result of the multiplication with a predetermined value to determine whether to transmit the input sample value to the next layer.

Referring back to FIG. 7, the AI setter 718 transmits the AI data to the data processor 716. The AI data includes pieces of information enabling the AI up-scaler 236 to perform AI up-scaling on the second image 135 to an up-scaling target corresponding to a down-scaling target of a first DNN. Upon receiving the first image 115 from the AI down-scaler 712, the first encoder 714 may reduce an information amount of the first image 115 by performing first encoding on the first image 115 according to a frequency transformation-based image compression method. The image data may be obtained as a result of the first encoding via a certain codec (for example, MPEG-2, H.264, MPEG-4, HEVC, VC-1, VP8, VP9, or AV1). The image data may be obtained according to the rule of the certain codec, namely, according to a syntax. For example, the image data may include residual data that is a difference between the first image 115 and prediction data of the first image 115, and prediction mode information, motion information, and quantization parameter related information that are used during the first encoding performed on the first image 115. The image data obtained as a result of the first encoding by the first encoder 714 is provided to the data processor 716.

The data processor 716 generates AI encoding data including the image data received from the first encoder 714 and the AI data received from the AI setter 718.

According to an embodiment, the data processor 716 may generate the AI encoding data including the image data and the AI data in a separate state. For example, the AI data may be included in a VSIF in an HDMI stream.

According to another embodiment, the data processor 716 may include AI data in the image data obtained as a result of the first encoding by the first encoder 714, and may generate AI encoding data including the image data. For example, the data processor 716 may generate image data in the form of one bitstream by combining a bitstream corresponding to the image data with a bitstream corresponding to the AI data. To this end, the data processor 716 may represent the AI data as bits each having a value of 0 or 1, namely, as a bitstream. According to an embodiment, the data processor 716 may include a bitstream corresponding to the AI data in the SEI, which is an additional information area of a bitstream obtained as a result of the first encoding.

The AI encoding data is transmitted to the transmitter 730. The transmitter 730 transmits the AI encoding data through a network. According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

Figure 9:
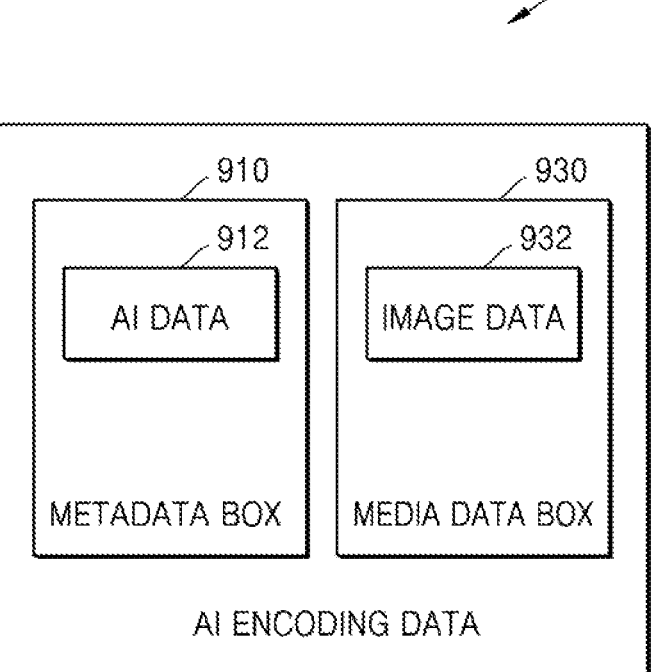
FIG. 9 is a block diagram of a structure of AI encoding data according to an embodiment.

FIG. 9 is a block diagram of a structure of AI encoding data 900 according to an embodiment.

As described above, AI data 912 and image data 932 may be separately included in the AI encoding data 900. The AI encoding data 900 may be in a container format such as MP4, AVI, MKV, or FLV. The AI encoding data 900 may include a metadata box 910 and a media data box 930.

The metadata box 910 includes information about the image data 932 included in the media data box 930. For example, the metadata box 910 may include information about the type of the first image 115, the type of codec used to encode the first image 115, and the playback time of the first image 115. The metadata box 910 may also include the AI data 912. The AI data 912 may be encoded according to an encoding method provided by a certain container format, and may be stored in the metadata box 910.

The media data box 930 may include the image data 932 generated according to the syntax of a certain image compression method.

Figure 10:
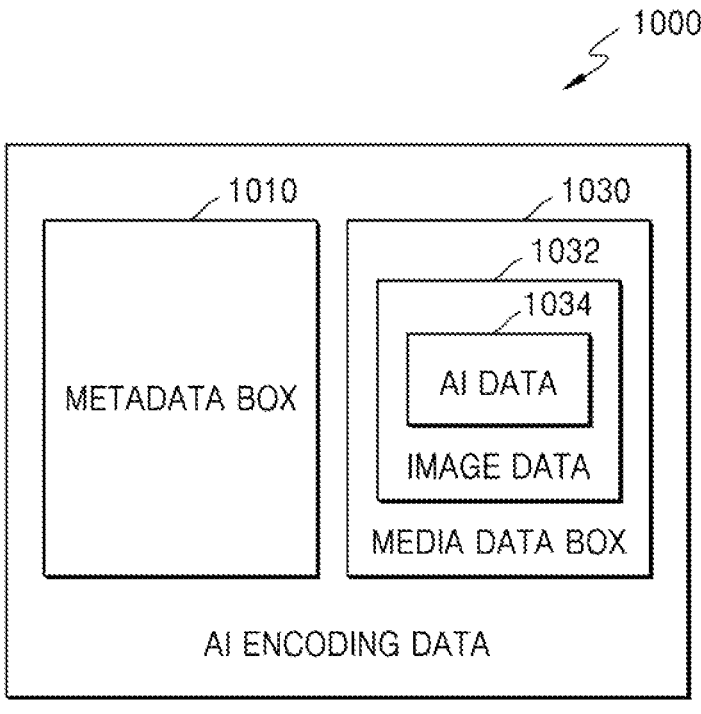
FIG. 10 is a block diagram of a structure of AI encoding data according to another embodiment

FIG. 10 is a block diagram of a structure of AI encoding data 1000 according to another embodiment.

Referring to FIG. 10, AI data 1034 may be included in image data 1032. The AI encoding data 1000 may include a metadata box 1010 and a media data box 1030. When the AI data 1034 is included in the image data 1032, the metadata box 1010 may not include the AI data 1034.

The media data box 1030 includes the image data 1032 including the AI data 1034. For example, the AI data 1034 may be included in an additional information area of the image data 1032.

A method of jointly training the first DNN 800 and the second DNN 300 will now be described with reference to FIG. 11.

Figure 11:
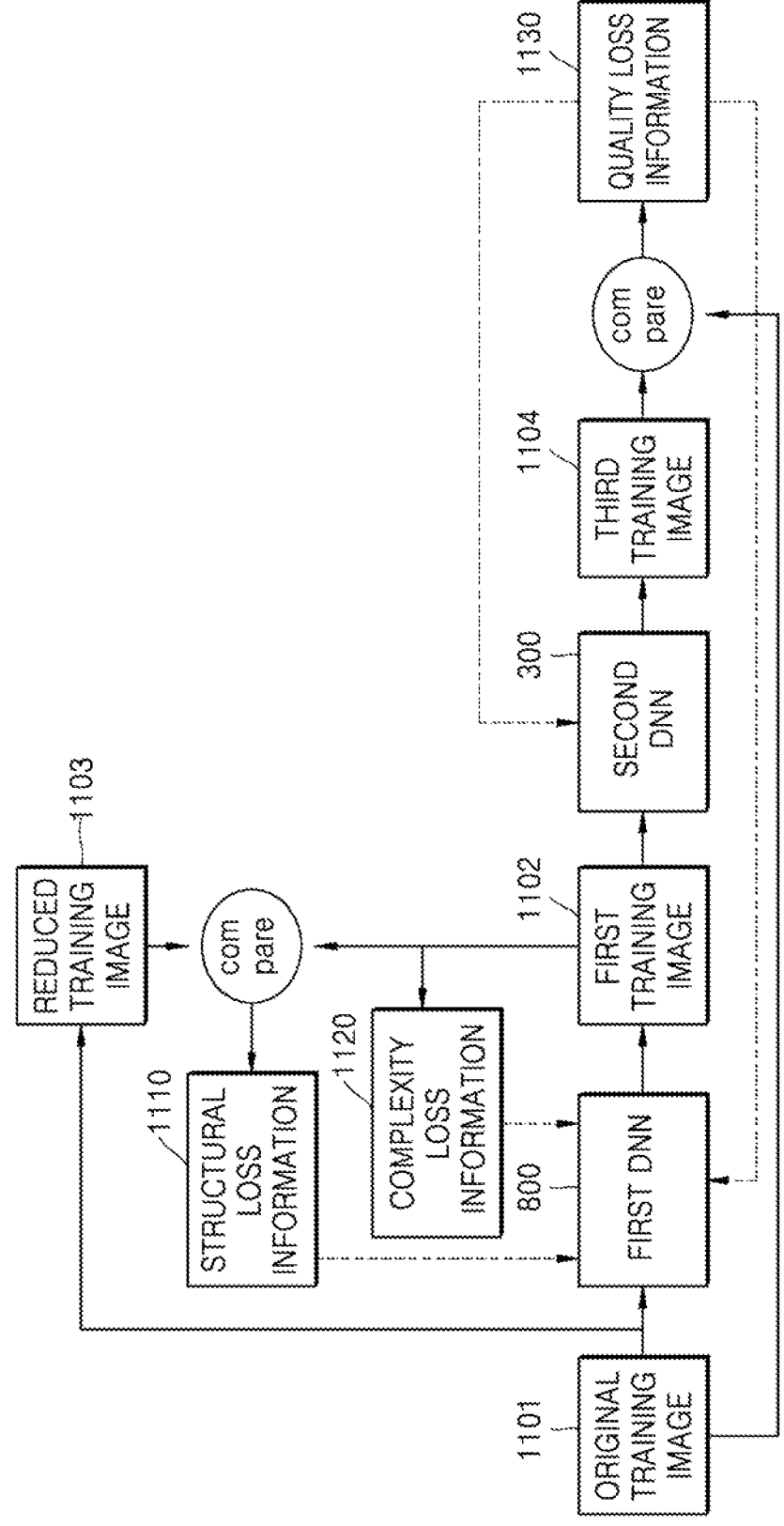
FIG. 11 is a diagram for describing a method of training a first DNN and a second DNN.

FIG. 11 is a diagram for describing a method of training the first DNN 800 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity between the AI encoding process and the AI decoding process is required. In other words, information lost in the AI encoding process needs to be reconstructed during the AI decoding process, and, to this end, the first DNN 800 and the second DNN 300 need to be jointly trained.

For accurate AI decoding, ultimately, quality loss information 1130 corresponding to a result of comparing a third training image 1104 and an original training image 1101 shown in FIG. 11 needs to be reduced. Accordingly, the quality loss information 1130 is used to train both of the first DNN 800 and the second DNN 300.

First, a training process shown in FIG. 11 will be described.

In FIG. 11, the original training image 1101 is an image on which AI down-scaling is to be performed, and a first training image 1102 is an image obtained by performing AI down-scaling on the original training image 1101. A third training image 1104 is an image obtained by performing AI up-scaling on the first training image 1102.

The original training image 1101 includes a still image or a moving image including a plurality of frames. According to an embodiment, the original training image 1101 may include a luminance image extracted from the still image or the moving image including the plurality of frames. According to an embodiment, the original training image 1101 may include a patch image extracted from the still image or the moving image including the plurality of frames. When the original training image 1101 includes the plurality of frames, the first training image 1102, a second training image, and the third training image 1104 also each include a plurality of frames. When the plurality of frames of the original training image 1101 are sequentially input to the first DNN 800, the plurality of frames of the first training image 1102, the second training image, and the third training image 1104 may be sequentially obtained through the first DNN 800 and the second DNN 300.

For joint training of the first DNN 800 and the second DNN 300, the original training image 1101 is input to the first DNN 800. The original training image 1101 input to the first DNN 800 is output as the first training image 1102 via the AI down-scaling, and the first training image 1102 is input to the second DNN 300. The third training image 1104 is output as a result of performing the AI up-scaling on the first training image 1102.

Referring to FIG. 11, the first training image 1102 is input to the second DNN 300, and according to an embodiment, a second training image obtained as first encoding and first decoding are performed on the first training image 1102 may be input to the second DNN 300. The second training image may be input to the second DNN 300 by using any one codec among MPEG-2, H.264, MPEG-4, HEVC, VC-1, VP8, VP9, and AV1. In detail, any one codec among MPEG-2, H.264, MPEG-4, HEVC, VC-1, VP8, VP9, and AV1 may be used to perform first encoding on the first training image 1102 and first decoding on image data corresponding to the first training image 1102.

Referring to FIG. 11, separate from the first training image 1102 being output through the first DNN 800, a reduced training image 1103 obtained by performing legacy down-scaling on the original training image 1101 is obtained. The legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 1103 is obtained to preserve the structural feature of the original training image 1101.

Before training is performed, the first DNN 800 and the second DNN 300 may be set to pre-determined DNN setting information. When the training is performed, structural loss information 1110, complexity loss information 1120, and the quality loss information 1130 may be determined.

The structural loss information 1110 may be determined based on a result of comparing the reduced training image 1103 and the first training image 1102. For example, the structural loss information 1110 may correspond to a difference between structural information of the reduced training image 1103 and structural information of the first training image 1102. Structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of image data obtained by performing first encoding on the first training image 1102. It is defined that the bitrate of the image data is low when the complexity loss information 1120 is small.

The quality loss information 1130 may be determined based on a result of comparing the original training image 1101 and the third training image 1104. The quality loss information 1130 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 1101 and the third training image 1104. The quality loss information 1130 indicates how similar the third training image 1104 is to the original training image 1101. The third training image 1104 is more similar to the original training image 1101 when the quality loss information 1130 is small.

Referring to FIG. 11, the structural loss information 1110, the complexity loss information 1120 and the quality loss information 1130 are used to train the first DNN 800, and the quality loss information 1130 is used to train the second DNN 300. In other words, the quality loss information 1130 is used to train both the first and second DNNs 800 and 300.

The first DNN 800 may update a parameter such that final loss information determined based on the structural loss information 1110, the complexity loss information 1120 and the quality loss information 1130 is reduced or minimized. The second DNN 300 may update a parameter such that the quality loss information 1130 is reduced or minimized.

The final loss information for training the first DNN 800 and the second DNN 300 may be determined as Equation 1 and Equation 2 below.

$$\text{LossDS} = a * \text{Structural loss information} + b * \text{Complexity loss information} + c * \text{Quality loss information} \quad \text{(Equation 1)}$$

$$\text{LossUS} = d * \text{Quality loss information} \quad \text{(Equation 2)}$$

In Equation 1 and Equation 2, LossDS indicates final loss information to be reduced or minimized to train the first DNN 800, and LossUS indicates final loss information to be reduced or minimized to train the second DNN 300. Also, a, b, c and d may be pre-determined certain weights.

In other words, the first DNN 800 updates parameters in a direction in which LossDS of Equation 1 is reduced, and the second DNN 300 updates parameters in a direction in which LossUS of Equation 2 is reduced. When the parameters of the first DNN 800 are updated according to LossDS derived during the training, the first training image 1102 obtained based on the updated parameters becomes different from a previous first training image 1102 obtained based on not updated parameters, and accordingly, the third training image 1104 also becomes different from a previous third training image 1104. When the third training image 1104 becomes different from the previous third training image 1104, the quality loss information 1130 is also newly determined, and the second DNN 300 updates the parameters accordingly. When the quality loss information 1130 is newly determined, LossDS is also newly determined, and the first DNN 800 updates the parameters according to newly determined LossDS. In other words, updating of the parameters of the first DNN 800 leads to updating of the parameters of the second DNN 300, and updating of the parameters of the second DNN 300 leads to updating of the parameters of the first DNN 800. In other words, because the first DNN 800 and the second DNN 300 are jointly trained by sharing the quality loss information 1130, the parameters of the first DNN 800 and the parameters of the second DNN 300 may be jointly optimized.

Referring to Equation 1 and Equation 2, it is verified that LossUS is determined according to the quality loss information 1130, but this is only an example, and LossUS may be determined based on the quality loss information 1130 and at least one of the structural loss information 1110 or the complexity loss information 1120.

It has been described above that the AI setter 238 of the AI decoding apparatus 200 and the AI setter 718 of the AI encoding apparatus 700 store the plurality of pieces of DNN setting information. Methods of training each of the plurality of pieces of DNN setting information stored in the AI setter 238 and the AI setter 718 will now be described.

As described above with reference to Equation 1 and Equation 2, the first DNN 800 updates the parameters considering the similarity (structural loss information 1110) between the structural information of the first training image 1102 and the structural information of the original training image 1101, the bitrate (complexity loss information 1120) of the image data obtained as a result of performing first encoding on the first training image 1102, and the difference (quality loss information 1130) between the third training image 1104 and the original training image 1101.

In detail, the parameters of the first DNN 800 may be updated such that the first training image 1102 having similar structural information as the original training image 1101 is obtained and the image data having a small bitrate is obtained when first encoding is performed on the first training image 1102, and at the same time, the second DNN 300 performing AI up-scaling on the first training image 1102 obtains the third training image 1104 similar to the original training image 1101.

A direction in which the parameters of the first DNN 800 are optimized may vary by adjusting the weights a, b, and c of Equation 1 and Equation 2. For example, when the weight b is determined to be high, the parameters of the first DNN 800 may be updated by prioritizing a low bitrate over high quality of the third training image 1104. When the weight c is determined to be high, the parameters of the first DNN 800 may be updated by prioritizing high quality of the third training image 1104 over a high bitrate or maintenance of the structural information of the original training image 1101.

The direction in which the parameters of the first DNN 800 are optimized may vary according to a type of codec used to perform first encoding on the first training image 1102, because the second training image to be input to the second DNN 300 may vary according to the type of codec.

In other words, the parameters of the first DNN 800 and the parameters of the second DNN 300 may be jointly updated based on the weights a, b, and c, and the type of codec for performing first encoding on the first training image 1102. Accordingly, when the first DNN 800 and the second DNN 300 are trained after determining the weights a, b, and c as certain values, respectively, and determining the type of codec as a certain type, the parameters of the first DNN 800 and the parameters of the second DNN 300 connected and optimized to each other may be determined.

When the first DNN 800 and the second DNN 300 are trained after changing the weights a, b, and c, and the type of codec, the parameters of the first DNN 800 and the parameters of the second DNN 300 connected and optimized to each other may be determined. In other words, the plurality of pieces of DNN setting information jointly trained with each other may be determined in the first DNN 800 and the second DNN 300 when the first DNN 800 and the second DNN 300 are trained while changing values of the weights a, b, and c, and the type of codec.

As described above with reference to FIG. 5, the plurality of pieces of DNN setting information of the first DNN 800 and the second DNN 300 may be mapped to pieces of information related to the first image. To set such a mapping relationship, first encoding may be performed on the first training image 1102 output from the first DNN 800 via a certain codec according to a certain bitrate, and the second training image obtained by performing first decoding on a bitstream obtained as a result of performing the first encoding may be input to the second DNN 300. In other words, by training the first DNN 800 and the second DNN 300 after setting an environment such that the first encoding is performed on the first training image 1102 of a certain resolution via the certain codec according to the certain bitrate, a DNN setting information pair mapped to the resolution of the first training image 1102, a type of the codec used to perform the first encoding on the first training image 1102, and the bitrate of the bitstream obtained as a result of performing the first encoding on the first training image 1102 may be determined. By variously changing the resolution of the first training image 1102, the type of codec used to perform the first encoding on the first training image 1102, and the bitrate of the bitstream obtained according to the first encoding of the first training image 1102, the mapping relationships between the plurality of pieces of DNN setting information of the first DNN 800 and the second DNN 300 and the pieces of information related to the first image may be determined.

Figure 12:
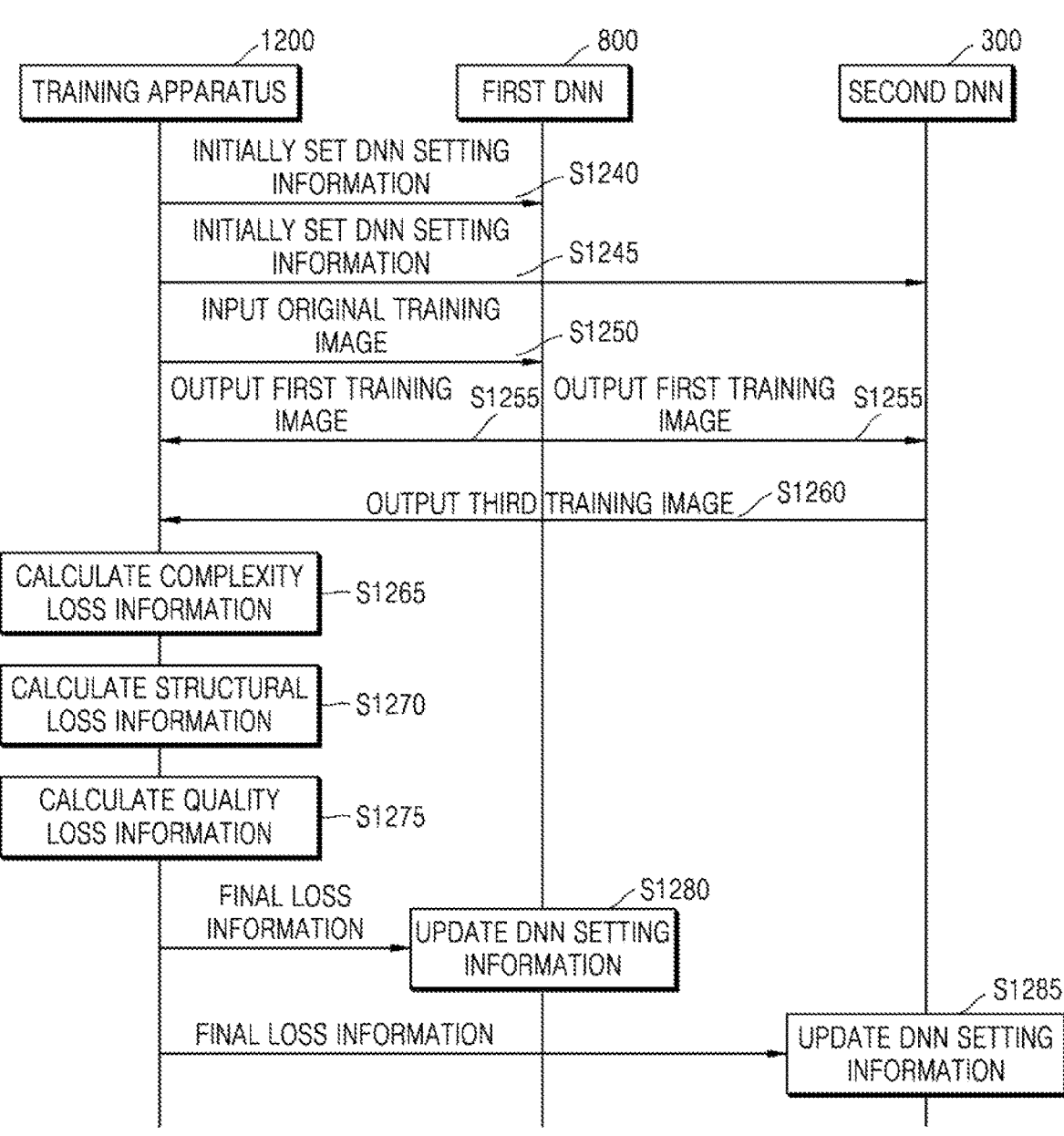
FIG. 12 is a diagram for describing training processes of a first DNN and a second DNN by a training apparatus, according to an embodiment.

FIG. 12 is a diagram for describing training processes of the first DNN 800 and the second DNN 300 by a training apparatus 1200.

The training of the first DNN 800 and the second DNN 300 described above with reference to FIG. 11 may be performed by the training apparatus 1200. The training apparatus 1200 includes the first DNN 800 and the second DNN 300. The training apparatus 1200 may be, for example, the AI encoding apparatus 700 or a separate server. The pieces of DNN setting information of the second DNN 300 obtained as the training result are stored in the AI decoding apparatus 200.

Referring to FIG. 12, the training apparatus 1200 initially sets the DNN setting information of the first DNN 800 and the DNN setting information of the second DNN 300, in operations S1240 and S1245, respectively. Accordingly, the first DNN 800 and the second DNN 300 may operate according to pre-determined DNN setting information. The DNN setting information may include information about at least one of the numbers of convolutional layers included in the first DNN 800 and the second DNN 300, the number of filter kernels for each convolutional layer, the size of a filter kernel for each convolutional layer, or a parameter of each filter kernel.

The training apparatus 1200 inputs the original training image 1101 to the first DNN 800, in operation S1250. The original training image 1101 may include a still image or at least one frame included in a moving image.

The first DNN 800 processes the original training image 1101 according to the initially set DNN setting information and outputs the first training image 1102 obtained by performing AI down-scaling on the original training image 1101, in operation S1255. In FIG. 12, the first training image 1102 output from the first DNN 800 is directly input to the second DNN 300. However, the first training image 1102 output from the first DNN 800 may be input to the second DNN 300 by the training apparatus 1200. The training apparatus 1200 may perform first encoding and first decoding on the first training image 1102 via a certain codec, and then input the second training image to the second DNN 300.

The second DNN 300 processes the first training image 1102 or the second training image according to the initially set DNN setting information and outputs the third training image 1104 obtained by performing AI up-scaling on the first training image 1102 or the second training image, in operation S1260.

The training apparatus 1200 calculates the complexity loss information 1120, based on the first training image 1102, in operation S1265.

The training apparatus 1200 calculates the structural loss information 1110 by comparing the reduced training image 1103 with the first training image 1102, in operation S1270.

The training apparatus 1200 calculates the quality loss information 1130 by comparing the original training image 1101 with the third training image 1104, in operation S1275.

The first DNN 800 updates the initially set DNN setting information via a back propagation process based on the final loss information, in operation S1280. The training apparatus 1200 may calculate the final loss information for training the first DNN 800, based on the complexity loss information 1120, the structural loss information 1110, and the quality loss information 1130.

The second DNN 300 updates the initially set DNN setting information via a back propagation process based on the quality loss information 1130 or the final loss information, in operation S1285. The training apparatus 1200 may calculate the final loss information for training the second DNN 300, based on the quality loss information 1130.

Then, the training apparatus 1200, the first DNN 800, and the second DNN 300 repeat operations S1250 through S1285 until the final loss information is minimized to update the DNN setting information. At this time, during each repetition, the first DNN 800 and the second DNN 300 operate according to the DNN setting information updated in a previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Number of frames | Information amount Bitrate) (Mbps) | | Subjective image quality score (VMAF) | |
|---|---|---|---|---|---|---|
| | | | HEVC | AI encoding/ AI decoding | HEVC | AI encoding/ AI decoding |
| Content_01 | 8 K | 300 | 46.3 | 21.4 | 94.80 | 93.54 |
| Content_02 | (7680 × 4320) | frames | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to an embodiment of the disclosure, is higher than subjective image quality when encoding and decoding are performed via HEVC, a bitrate is reduced by at least 50%.

A method of transmitting an image by adding a deblocking filter to address a blocking phenomenon caused by a decrease in a bandwidth due to a change in the environment of a streaming channel, when an image is streamed in real time by using an AI up-scale model and an AI down-scale model determined according to a resolution and a bitrate during image transmission according to the AI-based upscaling and downscaling described above with reference to FIGS. 1 through 12, will now be described.

Figure 13:
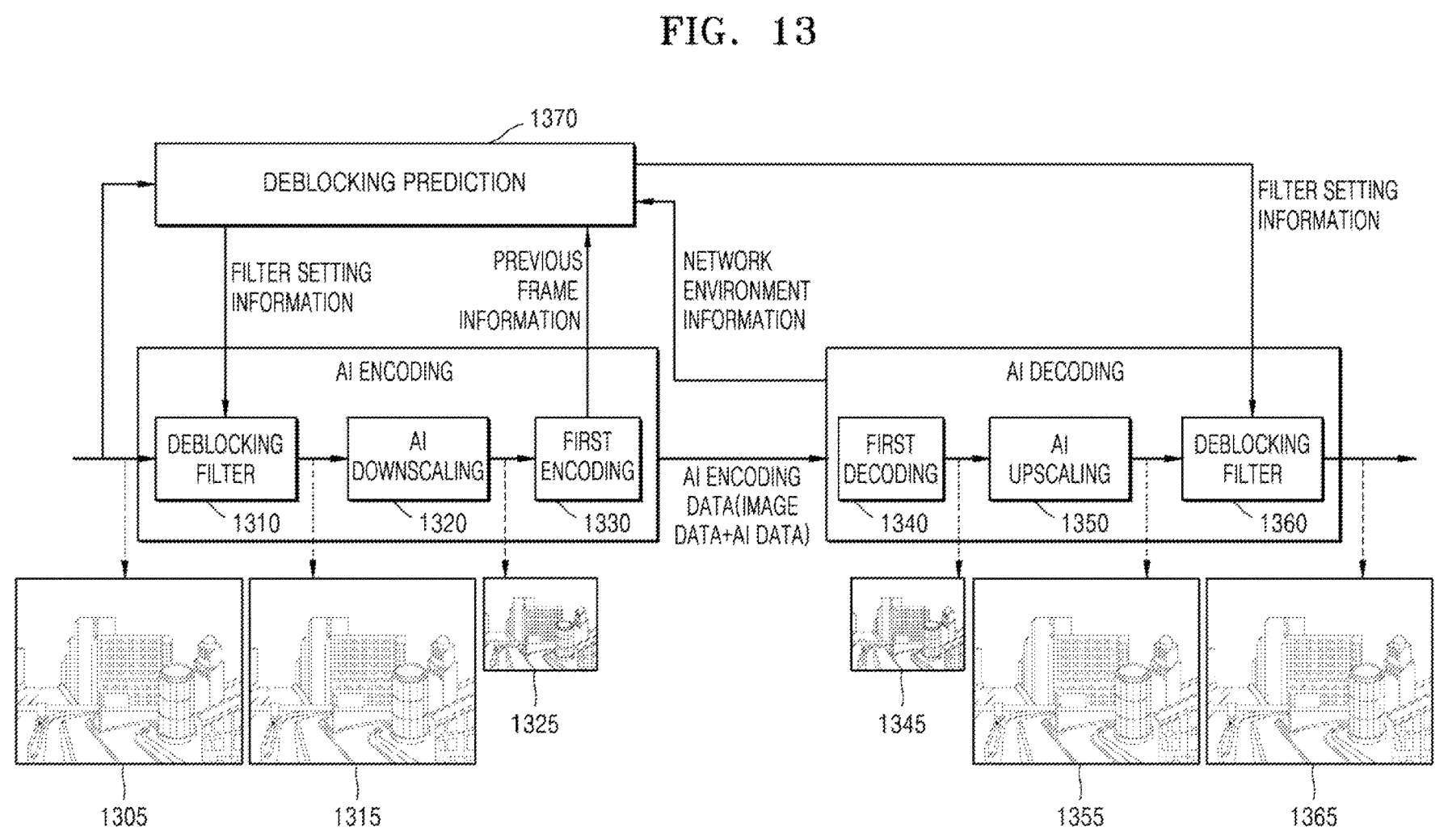

FIG. 13 is a diagram for describing an AI encoding process and an AI decoding process in which deblocking filtering is added, according to an embodiment.

As described above with reference to FIG. 1, when a streaming channel environment is normal, the original image 105 is AI downscaled (indicated by 110) based on an AI downscale model and an AI upscale model both suitable for the streaming channel environment to obtain the first image 115, the first image 115 is first encoded (indicated by 120) and transmitted, the AI encoding data including the AI data and the image data, which are obtained as a result of AI encoding, is received, the second image 135 is obtained via the first decoding 130, and the third image 145 is obtained by performing AI up-scaling 140 on the second image 135.

On the other hand, when there is a change in the environment of the streaming channel, for example, when a large number of users suddenly gather or the communication environment of a terminal deteriorates outdoors, the bandwidth is reduced, and accordingly, a quantization parameter is increased to lower the bitrate, resulting in occurrence of a blocking phenomenon according to the resolution and screen characteristics of an image. When a blocking phenomenon, that is, a blocking artifact, occurs, a viewer thinks that the quality of image is poor. In order to prevent such a blocking phenomenon, AI downscaling and AI upscaling are performed by adding a deblocking filter, leading to an improvement in the quality of image.

Referring to FIG. 13, in deblocking prediction 1370, network environment information of a current streaming channel, the original image 1305, and information of a previously-encoded frame are obtained to predict whether a blocking phenomenon is to occur in an input original image, and filter setting information, such as an area map for areas where blocks are generated, is transmitted when AI encoding and AI decoding are performed. In the AI encoding process, a deblocking filter 1310 is applied to the original image 1305, based on the filter setting information for such a deblocking filter to obtain a deblocking-filtered original image 1315, the deblocking-filtered original image 1315 is AI downscaled (indicated by 1320) to obtain a first image 1325, and the first image 1325 is first encoded (indicated by 1330) and transmitted. In the AI decoding process, AI encoding data including AI data and image data, which are obtained as a result of AI encoding, is received, a second image 1345 is obtained through first decoding 1340 and undergoes AI upscaling 1350 to obtain an AI-upscaled image 1355, and a deblocking filter 1360 according to the filter setting information received from the deblocking prediction 1370 is applied to the AI-upscaled image 1355 to obtain a reconstructed image 1365.

The network environment information is information indicating a change in the network environment, which is transmitted according to a real-time protocol (e.g., Real-time Transport Protocol (RTP) or Real-time Transport Control Protocol (RTCP)) used in network communication such as communication between mobile terminals or communication between a server and a client.

A blocking phenomenon may occur when the bandwidth is reduced due to the change in the network environment while streaming is being performed at a predetermined resolution and a predetermined bitrate. For example, an AI downscale model and an AI upscale model both suitable for each of the cases, such as when the resolution is 4K and the bitrate is 20 Mbps, when the resolution is 4K and the bitrate is 15 Mbps, when the resolution is FHD and the bitrate is 10 Mbps, when the resolution is FHD and the bitrate is 7.5 Mbps, and when the resolution is FHD and the bitrate is 7.5 Mbps, are selected, and, deblocking filtering is performed according to a change in the network environment during the AI encoding and AI decoding processes (e.g., a rapid increase in the number of users or deterioration of the outdoor communication environment), and according to a change in the network environment, the characteristics of the original image, and detection or non-detection of a blocking artifact in a previous frame in AI encoding and AI decoding through a deblocking prediction process. Thus, occurrence of a blocking artifact may be predicted and recognized in a variable and limited network bandwidth, and the blocking artifact may be removed to thereby improve the quality of image. In general, there is a deblocking filter for removing a blocking artifact in units of blocks, as an in-loop filter, in image encoding and decoding. However, because an in-loop filter is used, when strong deblocking filtering is applied, actual data may be damaged, and thus deblocking filtering is performed through an additional deblocking filter, thereby improving the quality of image.

The deblocking prediction 1370 obtains whether there is an area in which blocking is likely to occur from the original image 1305, obtains whether a blocking phenomenon of a previous frame of a current frame is detected from information of the previous frame, and obtains information about changes in a bandwidth, a bitrate, etc. from the network environment information, and thus transmits, during AI decoding and AI encoding, filter setting information including a blocking area map for areas where blocks may occur. Deblocking filtering is additionally performed when each of the AI decoding process and the AI encoding process is performed based on the transmitted filter setting information.

The deblocking filter 1310 in the AI encoding process is a pre-filter, and redistributes the image qualities of a complex area and a non-complex area when the total complexity is more complex than allocated bits. For example, when there are a simple area of an image, such as a tree standing still, and a complex and fast-moving area, such as a water stream coming out of a fountain, in an image, the complex area is simply blurred to reduce complexity to thereby save the bitrate, and a bitrate according to the reduced complexity is distributed to the simple area during encoding. Because the blocking phenomenon occurs when an image quality is not properly distributed, the occurrence probability of the blocking phenomenon may be reduced by redistributing the image quality. Blocking artifacts are made less noticeable by blurring the complex and fast-moving area, and occurrence of a blocking phenomenon of the simple area is prevented by allocating a bitrate reduced with more bitrates than before through the blur processing of the complex and fast-moving area to the simple area.

The deblocking filter 1360 in the AI decoding process is a post-filter, and applies deblocking filtering according to the blocking area map included in the filter setting information to create a sharpen effect where the boundary of a blurred portion is seen clear, and performs reconstruction by removing blocking artifacts.

In the deblocking prediction 1370, filter setting information including a blocking area map for a blocking artifact occurrence probability of a current frame and an occurrence probability for each area may be generated. In the original image, blocks are relatively more visible in fast-moving and complex areas and flat areas. Based on this point, a blocking area map representing a probability of occurrence of a blocking artifact may be created.

In addition, based on various criteria, a blocking area map may be generated according to a weighted average by generating a score map.

For example, an A score map may be created by calculating the complexity of each block or pixel from the original image to find an area with high complexity, giving a high score to the area with high complexity, and the complexity may be calculated based on a total variance value, etc. A B score map may be created by checking a movement from, for example, an N–1$^{th}$ frame and an optical flow, and giving a high score to an area in which a movement changes a lot.

In addition, when there are many blocking artifacts in a previous image, there may be many blocking artifacts in a current image. Accordingly, a C score map may be created by giving a high score to an area with many blocking artifacts in a previous area, and a D score map may be created by giving a high score to an area with a large difference in pixel boundary values at a block boundary.

Finally, during encoding, blocking artifacts may be generated according to the complexity of the current frame, the target bitrate thereof, and the quantization parameter (QP)

thereof. For example, an E score map may be created based on a delta quantization parameter (DQP) map representing a difference between an average QP of the pixels of a block of a current frame and a QP of each of the pixels. An F score map may be created based on a complexity according to coding, that is, a coding score, the coding score may be determined to be a sum of an intra coding score and an inter coding score, the intra coding score may be determined based on a difference between an original image and an intra-coded image and a prediction bit used to code an image, by using a current image as an input, and the inter coding score may be determined based on a difference between the original image and an inter-coded image and the prediction bit used to code an image, by using the current image and at least one previous image as an input. A G score map may be created based on a value obtained by dividing the coding score of the F score map by a target bitrate (channel information, a bandwidth). Accordingly, the G score map may be created based on a rate control in which an encoder estimates the bitrate of an encoded bitstream based on a bandwidth available on a network. Even when the coding score is large, when the target bitrate is relatively large, the score may not be large in the G score map.

As described above, a weight average of the A through G score maps may be a blocking area map. However, the A through G score maps are merely an example, and embodiments are not limited thereto.

In a deblocking prediction process, deblocking filtering may be performed according to filter setting information including the blocking area map.

According to an embodiment, the deblocking filter may be a legacy deblocking filter.

According to another embodiment, the deblocking filter may be a trained DNN. Accordingly, the filter setting information transmitted for the deblocking filter in deblocking prediction may include a blocking area map and DNN setting information. A method of training a third DNN for deblocking filtering for pre-filters performed before AI downscaling and a fourth DNN for deblocking filtering for post-filters performed after AI upscaling, when the deblocking filter is a DNN, and a training process will be described later with reference to FIGS. 20 and 21.

Accordingly, even when a change in the communication environment occurs, deblocking filtering is performed according to the network environment, the original image, and previous frame information without changing an AI downscale model and an AI upscale model both already selected at the beginning, and thus the quality of image may be adjusted while maintaining the AI downscale model and the AI upscale model.

According to an embodiment, based on the original image 1305, the previous frame information, and the network environment information obtained in the deblocking prediction 1370, information about the DQP map or rate control may be additionally transmitted to the first encoding 1330 and may be used to perform the first encoding.

Figure 14:
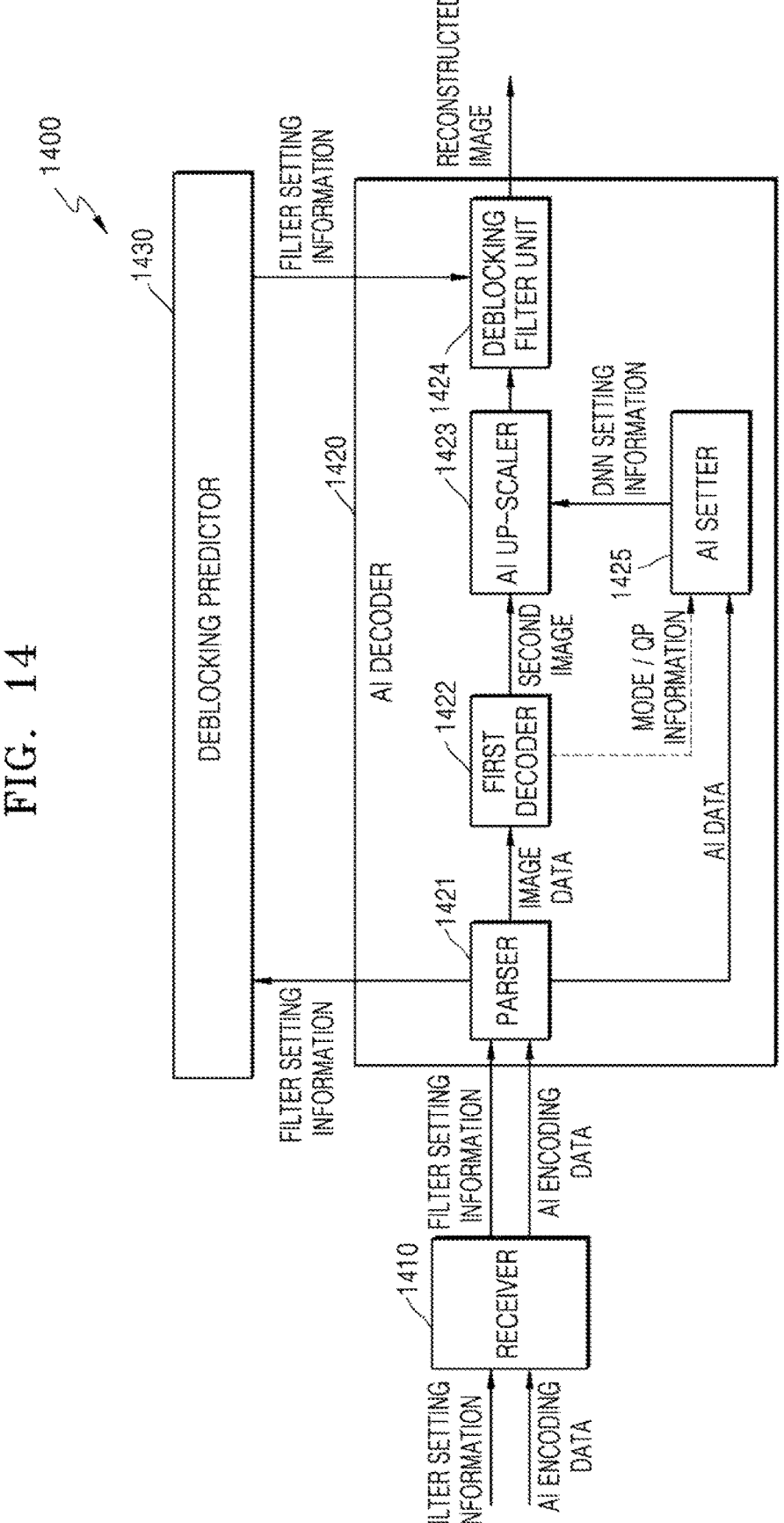
FIG. 14 is a block diagram of a structure of an AI decoding apparatus according to an embodiment.

FIG. 14 is a block diagram of a structure of an AI decoding apparatus 1400 according to an embodiment.

Referring to FIG. 14, the AI decoding apparatus 1400 according to an embodiment includes a receiver 1410, an AI decoder 1420, and a deblocking predictor 1430. The AI decoder 230 may include a parser 1421, a first decoder 1422, an AI up-scaler 1423, a deblocking filter unit 1424, and an AI setter 1425.

In FIG. 14, the receiver 1410, the AI decoder 1420, and the deblocking predictor 1430 are illustrated as separate devices. However, the receiver 1410, the AI decoder 1420, and the deblocking predictor 1430 may be implemented through one processor. In this case, the receiver 1410, the AI decoder 1420, and the deblocking predictor 1430 may be implemented as a dedicated processor, or may be implemented through a combination of software and a general-purpose processor such as an application processor (AP), a central processing unit (CPU), or a graphic processing unit (GPU). The dedicated processor may include a memory for implementing an embodiment of the disclosure or a memory processing unit for using an external memory.

The receiver 1410, the AI decoder 1420, and the deblocking predictor 1430 may be configured by a plurality of processors. In this case, the receiver 1410, the AI decoder 1420, and the deblocking predictor 1430 may be implemented as a combination of dedicated processors, or may be implemented through a combination of software and a plurality of general-purpose processors such as an AP, a CPU, or a GPU. According to an embodiment, the receiver 1410 may be implemented as a first processor, the first decoder 1422 may be implemented as a second processor different from the first processor, the parser 1421, the AI up-scaler 1423, the deblocking filter unit 1424, and the AI setter 1425 may be implemented as a third processor different from the first processor and the second processor, and the deblocking predictor 1430 may be implemented as a fourth processor different from the first processor, the second processor, and the third processor.

The receiver 1410 receives AI encoding data obtained as a result of AI encoding and filter setting information transmitted by a deblocking predictor of an AI encoding apparatus. For example, the AI encoding data may be a video file having a file format such as mp4 or mov.

The receiver 1410 may receive AI encoding data and filter setting information transmitted through a network. The receiver 1410 outputs the AI encoding data and the filter setting information to the AI decoder 1420.

According to another embodiment, the receiver 1410 may receive AI encoding data including filter setting information.

According to an embodiment, the AI encoding data may be data obtained from a data storage medium including a magnetic medium (such as a hard disk, a floppy disk, or a magnetic tape), an optical recording medium (such as CD-ROM or DVD), or a magneto-optical medium (such as a floptical disk).

The parser 1421 parses the AI encoding data to transmit the image data generated as a result of the first encoding of the first image 1325 to the first decoder 1422, and transmits the AI data to the AI setter 1425 and transmits the filter setting information to the deblocking predictor 1430.

According to an embodiment, the deblocking predictor 1430 transmits the filter setting information to the deblocking filter unit 1424. The filter setting information may include a blocking area map representing areas where blocking artifacts occur.

According to another embodiment, the filter setting information may include the blocking area map representing areas where blocking artifacts occur, and DNN setting information of a DNN for deblocking filtering.

According to an embodiment, the parser 1421 may parse the image data and the AI data separately included in the AI encoding data. The parser 1421 may distinguish between the image data and the AI data included in the AI encoding data, by reading a header within the AI encoding data. For example, the AI data may be included in a Vendor Specific InfoFrame (VSIF) in an HDMI stream. The structure of the AI encoding data including the AI data and the image data separated from each other has been described above with reference to FIG. 9, and thus a description thereof will be omitted.

According to another embodiment, the parser 1421 may parse the image data from the AI encoding data, extract the AI data from the image data, transmit the AI data to the AI setter 1425, and transmit the remaining image data to the first decoder 1422. In other words, the AI data may be included in the image data. For example, the AI data may be included in supplemental enhancement information (SEI), which is an additional information area of a bitstream corresponding to the image data. The structure of the AI encoding data including the image data including the AI data has been described above with reference to FIG. 10, and thus a description thereof will be omitted.

According to another embodiment, the parser 1421 parses the image data, the AI data, and the filter setting information separately included in the AI encoding data, output the image data generated as a result of the first encoding of the first image 1325 to the first decoder 1422, output the AI data to the AI setter 1425, and output the filter setting information to the deblocking predictor 1430.

According to another embodiment, the parser 1421 may split the bitstream corresponding to the image data into a bitstream to be processed by the first decoder 1422 and a bitstream corresponding to the AI data, and may output the two bitstreams to the first decoder 1422 and the AI setter 1425, respectively.

The parser 1421 may verify that the image data included in the AI encoding data is image data obtained via a certain codec (for example, MPEG-2, H.264 AVC, MPEG-4, HEVC, VC-1, VP8, VP9, or AV1). In this case, corresponding information may be transmitted to the first decoder 1422 such that the image data is processed via the verified codec.

The first decoder 1422 reconstructs the second image 1345 corresponding to the first image 1325, based on the image data received from the parser 1421. The second image 1345 obtained by the first decoder 1422 is provided to the AI up-scaler 1423.

According to an embodiment, first decoding related information, such as prediction mode information, motion information, quantization parameter information, or the like, may be provided by the first decoder 1422 to the AI setter 1425. The first decoding related information may be used to obtain DNN setting information.

The AI data provided to the AI setter 1425 includes pieces of information enabling the second image 1345 to be processed via AI up-scaling. Here, an up-scaling target of the second image 1345 should correspond to a down-scaling target of a first DNN. Accordingly, the AI data needs to include information for verifying the down-scaling target of the first DNN.

Examples of the information included in the AI data include difference information between resolution of the original image 1305 and resolution of the first image 1325, and information related to the first image 132.

The difference information may be expressed as information about a resolution conversion degree of the first image 1325 compared to the original image 1305 (for example, resolution conversion rate information). Because the resolution of the first image 1325 is verified through the resolution of the reconstructed second image 1345 and the resolution conversion degree is verified accordingly, the difference information may be expressed only as resolution information of the original image 1305. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 1325 may include information about at least one of resolution of the first image 1325, a bitrate of the image data obtained as the result of performing first encoding on the first image 1325, or a codec type used during the first encoding of the first image 1325.

The AI setter 1425 may determine the up-scaling target of the second image 1345, based on at least one of the difference information or the information related to the first image 1325, which are included in the AI data. The up-scaling target may indicate, for example, to what degree resolution is to be up-scaled for the second image 1345.

When the up-scaling target is determined, the AI up-scaler 1423 performs AI up-scaling on the second image 1345 through a second DNN to obtain the AI-upscaled image 1355 corresponding to the up-scaling target.

The deblocking filter unit 1424 obtains a third image 1365 by applying deblocking filtering to the second image 1355, which is upscaled, based on the filter setting information obtained from the deblocking predictor 1430.

The AI upscaling process through the second DNN has been described above with reference to FIGS. 3 and 4, and thus a description thereof will be omitted.

A method, whereby the AI setter 1425 determines an up-scale target, based on the AI data, and the AI up-scaler 1423 performs the AI up-scaling on the second image 1345 according to the up-scaling target, will now be described.

According to an embodiment, the AI setter 1425 may store a plurality of pieces of DNN setting information settable in a second DNN.

Here, the DNN setting information may include information about at least one of the number of convolutional layers included in the second DNN, the number of filter kernels for each convolutional layer, or a parameter of each filter kernel.

The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolutional layers based on any piece of DNN setting information, and may include four convolutional layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 1425 may obtain the DNN setting information for performing AI up-scaling on the second image 1345, among the plurality of pieces of DNN setting information. Each of the plurality of pieces of DNN setting information used at this time is information for obtaining the upscaled second image 1355 of pre-determined resolution and/or pre-determined quality, and is trained jointly with a first DNN.

For example, one piece of DNN setting information among the plurality of pieces of DNN setting information may include pieces of information for obtaining the third image 1365 of resolution twice higher than resolution of the second image 1345, for example, the third image 1365 of 4 K (4096×2160) twice higher than 2 K (2048×1080) of the second image 1345, and another piece of DNN setting information may include pieces of information for obtaining the third image 1365 of resolution four times higher than the resolution of the second image 1345, for example, the third image 1365 of 8 K (8192×4320) four times higher than 2 K (2048×1080) of the second image 1345.

Figure 15:
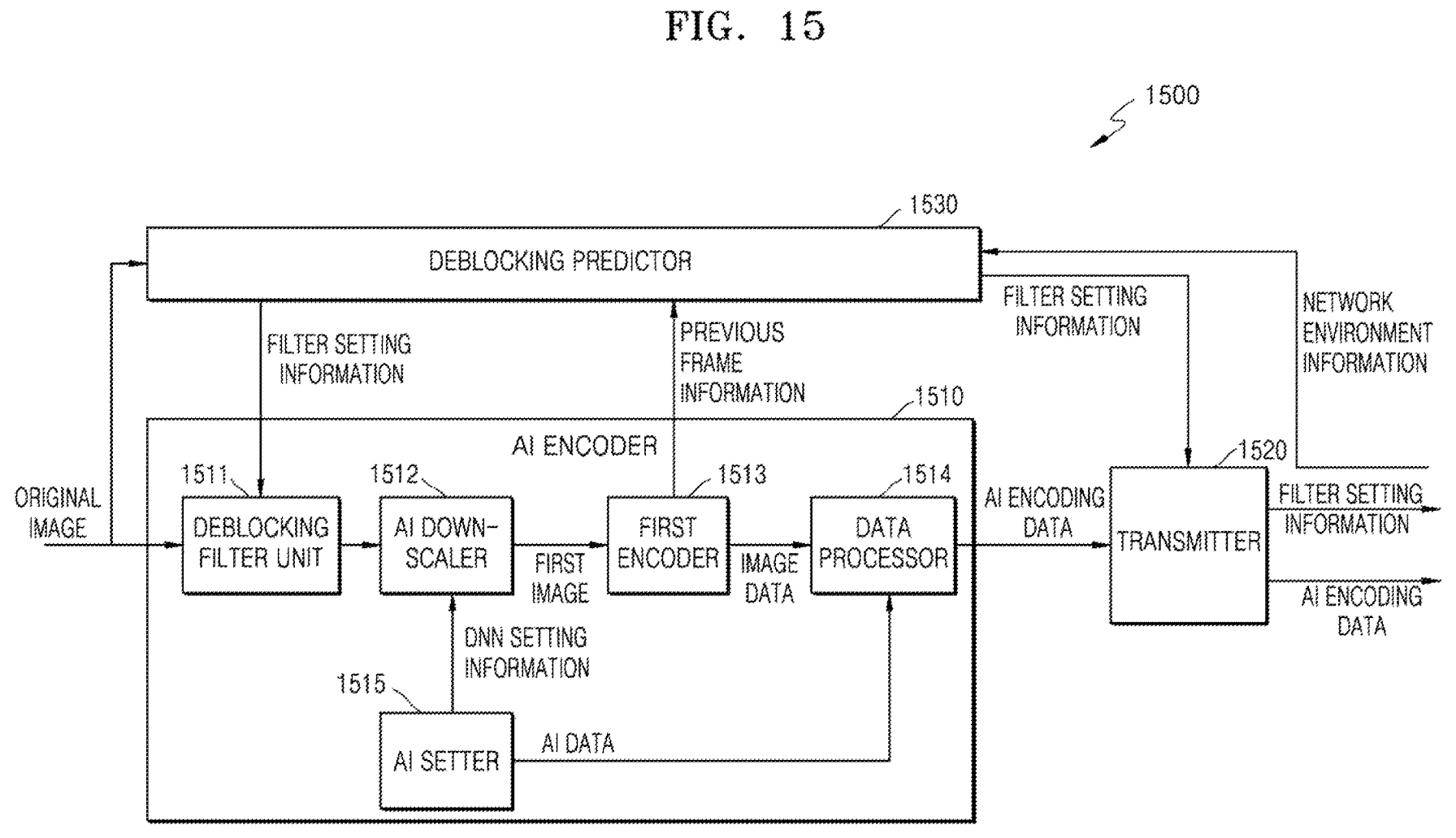

Each of the plurality of pieces of DNN setting information is obtained jointly with DNN setting information of the first DNN of an AI encoding apparatus 1500 of FIG. 15, and the AI setter 1425 obtains one piece of DNN setting information among the plurality of pieces of DNN setting information according to an enlargement ratio corresponding to a reduction ratio of the DNN setting information of the first DNN. To this end, the AI setter 1425 may verify information of the first DNN. In order for the AI setter 1425 to verify the information of the first DNN, the AI decoding apparatus 1400 according to an embodiment receives AI data including the information of the first DNN from the AI encoding apparatus 1500.

In other words, the AI setter 1425 may verify information targeted by DNN setting information of the first DNN used to obtain the first image 1325 and obtain the DNN setting information of the second DNN trained jointly with the DNN setting information of the first DNN, by using pieces of information received from the AI encoding apparatus 1500.

When DNN setting information for performing the AI up-scaling on the second image 1345 is obtained from among the plurality of pieces of DNN setting information, the obtained DNN setting information may be transmitted to the AI up-scaler 1423, and input data may be processed based on the second DNN operating according to the obtained DNN setting information.

For example, when any one piece of DNN setting information is obtained, the AI up-scaler 1423 may set the number of filter kernels included in each of the first, second, and third convolutional layers 310, 330, and 350 of the second DNN 300 of FIG. 3, and the respective parameters of the filter kernels to be values included in the obtained DNN setting information.

In detail, when parameters of a filter kernel of 3×3 used in any one convolutional layer of the second DNN of FIG. 4 are {1, 1, 1, 1, 1, 1, 1, 1, 1} and there is a change in DNN setting information, the AI up-scaler 1423 may replace the parameters of the filter kernel with {2, 2, 2, 2, 2, 2, 2, 2, 2}, which are parameters included in the changed DNN setting information.

The AI setter 1425 may obtain the DNN setting information for AI up-scaling the second image 1345 from among the plurality of pieces of DNN setting information, based on information included in the AI data, and the AI data used to obtain the DNN setting information will now be described.

According to an embodiment, the AI setter 1425 may obtain the DNN setting information for AI up-scaling the second image 1345 from among the plurality of pieces of DNN setting information, based on difference information included in the AI data. For example, when it is verified that the resolution (for example, 4 K (4096×2160)) of the original image 1305 is twice higher than the resolution (for example, 2 K (2048×1080)) of the first image 1325, based on the difference information, the AI setter 238 may obtain the DNN setting information for increasing the resolution of the second image 1345 two times.

According to another embodiment, the AI setter 1425 may obtain the DNN setting information for AI up-scaling the second image 1345 from among the plurality of pieces of DNN setting information, based on information related to the first image 1325 included in the AI data. The AI setter 1425 may pre-determine a mapping relationship between pieces of image-related information and pieces of DNN setting information, and obtain the DNN setting information mapped to the information related to the first image 1325.

FIG. 15 is a block diagram of a structure of the AI encoding apparatus 1500 according to an embodiment.

Referring to FIG. 15, the AI encoding apparatus 1500 may include an AI encoder 1510, a transmitter 1520, and a deblocking predictor 1530. The AI encoder 1510 may include a deblocking filter unit 1511, an AI down-scaler 1512, a first encoder 1513, a data processor 1514, and an AI setter 1515.

In FIG. 15, the AI encoder 1510, the transmitter 1520, and the deblocking predictor 1530 are illustrated as separate devices. However, the AI encoder 1510, the transmitter 1520, and the deblocking predictor 1530 may be implemented through one processor. In this case, the AI encoder 1510, the transmitter 1520, and the deblocking predictor 1530 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The AI encoder 1510, the transmitter 1520, and the deblocking predictor 1530 may be configured by a plurality of processors. In this case, the AI encoder 1510, the transmitter 1520, and the deblocking predictor 1530 may be implemented as a combination of dedicated processors, or may be implemented through a combination of software and a plurality of general-purpose processors such as an AP, a CPU, or a GPU. According to an embodiment, the first encoder 1513 may be implemented as a first processor, the deblocking filter unit 1511, the AI down-scaler 1512, the data processor 1514, and the AI setter 1515 may be implemented as a second processor different from the first processor, the transmitter 1520 may be implemented as a third processor different from the first processor and the second processor, and the deblocking predictor 1530 may be implemented as a fourth processor different from the first processor, the second processor, and the third processor.

The deblocking predictor 1530 obtains the original image 1305, the previous frame information, and the network environment information, and transmits the filter setting information to the deblocking filter unit 1511, based on the original image 1305, the previous frame information, and the network environment information.

The deblocking predictor 1530 obtains the previous frame information from the first encoder 1513 and obtains the network environment information from the AI decoding apparatus 1400 according to a real-time protocol.

According to an embodiment, the deblocking predictor 1530 transmits the filter setting information to the deblocking filter unit 1511. The filter setting information may include a blocking area map representing areas where blocking artifacts occur.

According to another embodiment, the filter setting information may include the blocking area map representing areas where blocking artifacts occur, and DNN setting information of a DNN for deblocking filtering.

The deblocking filter unit 1511 obtains the deblocking-filtered original image 1315 by applying deblocking filtering to the original image 1305 based on the filter setting information obtained from the deblocking predictor 1530.

The AI encoder 1513 performs AI down-scaling on the deblocking-filtered original image 1315 and first encoding on the first image 1325, and transmits AI encoding data to the transmitter 1520. The transmitter 1520 transmits the AI encoding data and the filter setting information to the AI decoding apparatus 1400.

According to another embodiment, the transmitter 1520 transmits AI encoded data including filter setting information, AI data, and image data to the AI decoding apparatus 1400.

The image data includes data obtained as a result of performing the first encoding on the first image 1325. The image data may include data obtained based on pixel values in the first image 1325, for example, residual data that is a difference between the first image 1325 and prediction data of the first image 1325. The image data also includes pieces of information used during the first encoding performed on the first image 1325. For example, the image data may include prediction mode information, motion information, and information related to a QP used during the first encoding performed on the first image 1325.

The AI data includes pieces of information enabling the AI up-scaler 1423 to perform AI up-scaling on the second image 1345 to an up-scaling target corresponding to a down-scaling target of a first DNN.

For example, the AI data may include difference information between the original image 1305 and the first image 1325.

For example, the AI data may include information related to the first image 1325. The information related to the first image 1325 may include information about at least one of resolution of the first image 1325, a bitrate of the image data obtained as the result of performing first encoding on the first image 1325, or a codec type used during the first encoding of the first image 1325.

According to an embodiment, the AI data may include an identifier of mutually agreed DNN setting information such that the AI up-scaling is performed on the second image 1345 to the up-scaling target corresponding to the down-scaling target of the first DNN.

According to an embodiment, the AI data may include DNN setting information settable in a second DNN.

The AI down-scaler 1512 may obtain the AI-downscaled image 1325 by performing the AI down-scaling on the deblocking-filtered original image 1315 through the first DNN. The AI down-scaler 1512 may perform the AI down-scaling on the deblocking-filtered original image 1315 by using the DNN setting information provided by the AI setter 1515.

The AI setter 1515 may determine the down-scaling target of the original image 105, based on a pre-determined standard.

In order to obtain the first image 1325 matching the down-scaling target, the AI setter 1515 may store a plurality of pieces of DNN setting information settable in the first DNN. The AI setter 1515 obtains DNN setting information corresponding to the down-scaling target from among the plurality of pieces of DNN setting information, and provides the obtained DNN setting information to the AI down-scaler 1512.

Each of the plurality of pieces of DNN setting information may be trained to obtain the first image 1325 of pre-determined resolution and/or pre-determined quality. For example, any one piece of DNN setting information among the plurality of pieces of DNN setting information may include pieces of information for obtaining the first image 1325 of a resolution that is half the resolution of the original image 1305, for example, the first image 1325 of 2 K (2048×1080) that is half 4 K (4096×2160) of the original image 1305, and another piece of DNN setting information may include pieces of information for obtaining the first image 1325 of a resolution that is quarter the resolution of the original image 1305, for example, the first image 1325 of 2 K (2048×1080) that is quarter 8 K (8192×4320) of the original image 1305.

According to an embodiment, when pieces of information (for example, the number of convolutional layers, the number of filter kernels for each convolutional layer, a parameter of each filter kernel, and the like) constituting the DNN setting information are stored in a form of a lookup table, the AI setter 1515 may obtain the DNN setting information by combining some values selected from the values in the lookup table, according to the down-scaling target, and may provide the obtained DNN setting information to the AI down-scaler 1512.

According to an embodiment, the AI setter 1515 may determine a structure of DNN corresponding to the down-scaling target, and may obtain the DNN setting information, for example, parameters of a filter kernel, corresponding to the determined structure of DNN.

The plurality of pieces of DNN setting information for performing the AI down-scaling on the deblocking-filtered original image 1315 may have an optimized value as the first DNN and the second DNN are jointly trained. Here, each piece of DNN setting information includes at least one of the number of convolutional layers included in the first DNN, the number of filter kernels for each convolutional layer, or a parameter of each filter kernel.

The AI down-scaler 1512 may set the first DNN with the DNN setting information determined to perform the AI down-scaling on the deblocking-filtered original image 1315 to obtain the first image 1325 of certain resolution and/or certain quality through the first DNN. When the DNN setting information for performing the AI down-scaling on the original image 1305 is obtained from the plurality of pieces of DNN setting information, each layer in the first DNN may process input data based on pieces of information included in the DNN setting information.

A method, performed by the AI setter 1515, of determining the down-scaling target will now be described. The down-scaling target may indicate, for example, by how much is resolution decreased from the deblocking-filtered original image 1315 to obtain the first image 1325.

The AI setter 1515 obtains one or more pieces of input information. According to an embodiment, the input information may include at least one of a target resolution of the first image 1325, a target bitrate of the image data, a bitrate type of the image data (e.g., a variable bitrate type, a constant bitrate type, or an average bitrate type), a color format (luminance component, chrominance component, red component, green component, blue component, or the like) to which AI downscaling is applied, a codec type for the first encoding of the first image 1325, compression history information, and a resolution of the original image 1305, or a type of the original image 1305.

The one or more pieces of input information may include information previously stored in the AI encoding apparatus 1500 or received from a user.

The AI setter 1515 controls an operation of the AI down-scaler 1512, based on the input information. According to an embodiment, the AI setter 1515 may determine the down-scaling target according to the input information, and may provide DNN setting information corresponding to the determined down-scaling target to the AI down-scaler 1512.

According to an embodiment, the AI setter 1515 may transmit at least a portion of the input information to the first encoder 1513 so that the first encoder 1513 may perform first encoding on the first image 1325 via a bitrate of a certain value, a bitrate of a certain type, and a certain codec.

According to another embodiment, the deblocking predictor 1530 may additionally obtain the information about the DQP map or rate control to the first encoding 1330, based on the original image 1305, the previous frame information, and the network environment information, and may transmit the information about the DQP map or rate control to the first encoder 1513. The first encoder 1513 may use the information about the DQP map or rate control to perform first encoding on the first image 1325.

According to an embodiment, the AI setter 1515 may determine the down-scaling target based on at least one of a compression ratio (for example, a resolution difference between the original image 1305 and the first image 1325, target bitrate, or the like), compression quality (for example, type of bitrate), compression history information, or a type of the original image 1305.

For example, the AI setter 1515 may determine the down-scaling target based on the compression ratio, the compression quality, or the like, which is pre-set or input from a user.

As another example, the AI setter 1515 may determine the down-scaling target by using the compression history information stored in the AI encoding apparatus 1500. For example, according to the compression history information usable by the AI encoding apparatus 1500, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI setter 1515 may determine the down-scaling target based on the encoding quality that has been used more frequently than a certain threshold value (for example, average quality of the encoding quality that has been used more frequently than the certain threshold value), according to the compression history information.

As another example, the AI setter 1515 may determine the down-scaling target, based on the resolution, type (for example, a file format), or the like of the original image 1305.

According to an embodiment, when the original image 1305 includes a plurality of frames, the AI setter 1515 may independently obtain DNN setting information for a certain number of frames, and may provide the independently-obtained DNN setting information to the AI down-scaler 1512.

According to an embodiment, the AI setter 1515 may divide the frames included in the original image 1305 into a certain number of groups, and independently obtain the DNN setting information for each group. The same or different pieces of DNN setting information may be obtained for each group. The number of frames included in the groups may be the same or different according to each group.

According to another embodiment, the AI setter 1515 may independently determine DNN setting information for each frame forming the original image 1305. The same or different pieces of DNN setting information may be obtained for each frame.

Embodiments in which the positions of deblocking filters are different from the deblocking filter's position of FIG. 13 will now be described with reference to FIGS. 16 through 18.

Figure 16:
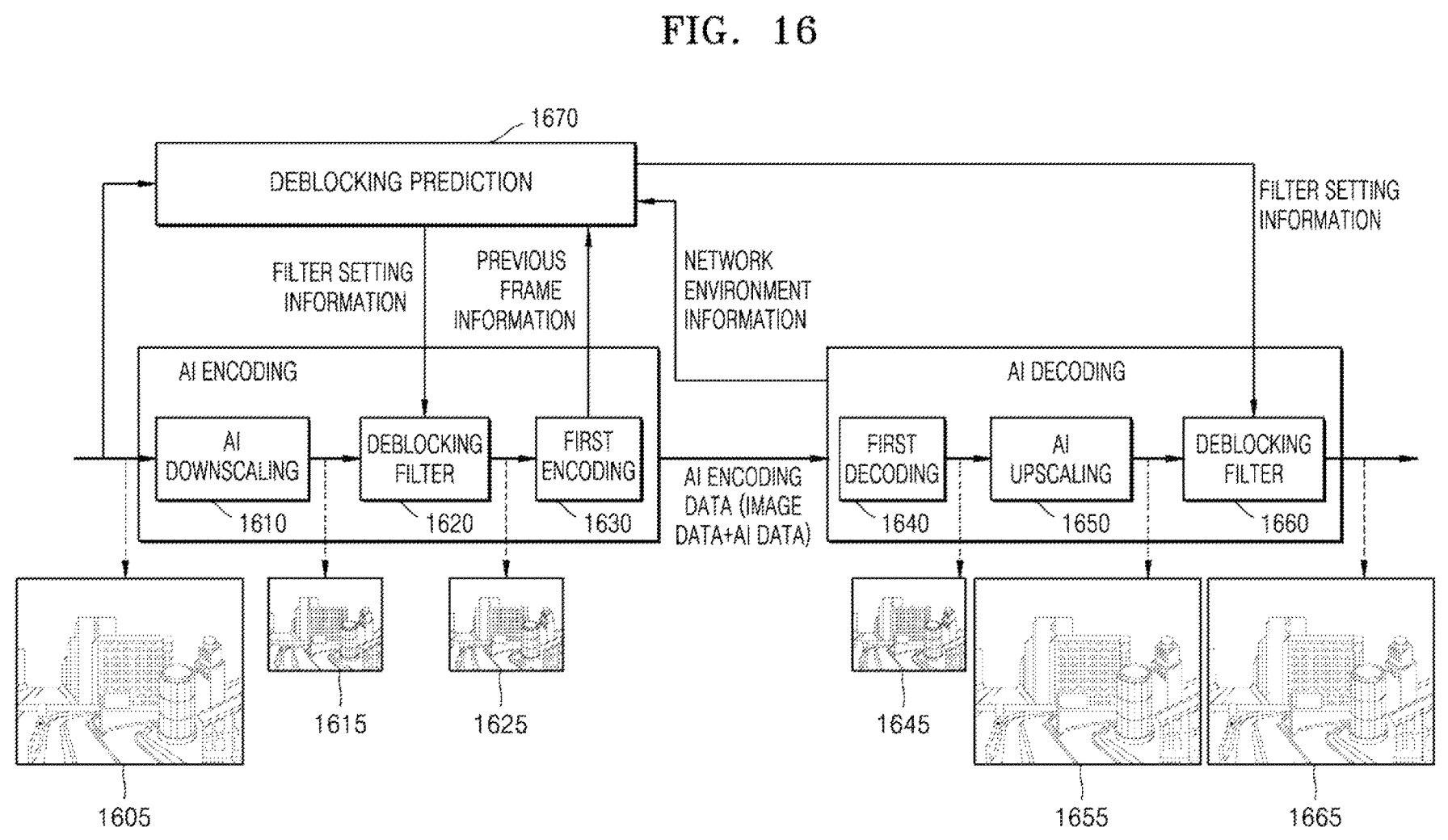

FIG. 16 is a diagram for describing an AI encoding process and an AI decoding process in which deblocking filtering is adaptively added, according to another embodiment.

FIG. 16 illustrates an embodiment in which the position of a deblocking filter in an AI encoding process is changed compared to the AI encoding process and the AI decoding process in which deblocking filtering is adaptively added in FIG. 13.

Referring to FIG. 16, in a deblocking prediction process 1670, network environment information of a current streaming channel, the original image 1605, and information of a previously-encoded frame are obtained to predict whether a blocking phenomenon is to occur in an input original image, and filter setting information, such as a blocking area map for areas where blocks are generated, is transmitted when AI encoding and AI decoding are performed. In the AI encoding process, an original image 1605 undergoes AI downscaling 1610 to obtain a first image 1615, a deblocking filter 1620 is applied to the first image 1615, based on filter setting information obtained in a deblocking prediction process 1670, to obtain a deblocking-filtered first image 1625, and the deblocking-filtered first image 1625 is AI encoded (indicated by 1630) and transmitted. In the AI decoding process, AI encoding data including AI data and image data, which are obtained as a result of AI encoding, is received, a second image 1645 is obtained through first decoding 1640 and undergoes AI upscaling 1650 to obtain an AI-upscaled image 1355, and a deblocking filter 1660 according to the filter setting information received from the deblocking prediction 1370 is applied to obtain a third image 1665.

Figure 17:
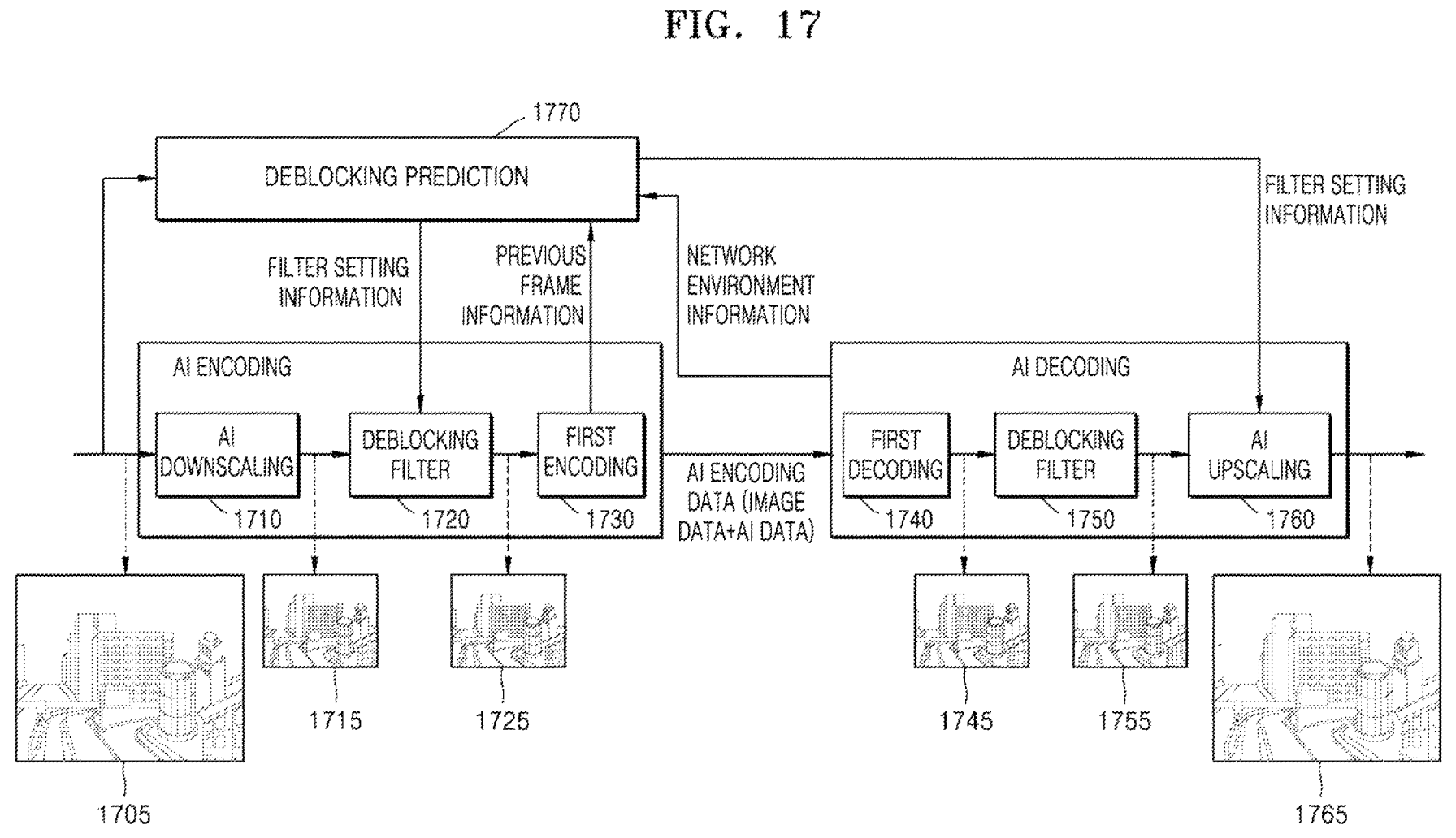

FIG. 17 is a diagram for describing an AI encoding process and an AI decoding process in which deblocking filtering is adaptively added, according to another embodiment.

FIG. 17 illustrates an embodiment in which the position of a deblocking filter in an AI encoding process and the position of a deblocking filter in an AI decoding process are changed compared to the AI encoding process and the AI decoding process in which deblocking filtering is adaptively added in FIG. 13.

Referring to FIG. 17, in deblocking prediction 1770, network environment information of a current streaming channel, an original image 1705, and information of a previously-encoded frame are obtained to predict whether a blocking phenomenon is to occur in an input original image, and filter setting information, such as an area map for areas where blocks are generated, is transmitted when AI encoding and AI decoding are performed. In the AI encoding process, an original image 1705 undergoes AI downscaling 1710 to obtain a first image 1715, a deblocking filter 1720 is applied to the first image 1715, based on filter setting information obtained in a deblocking prediction 1770, to obtain a deblocking-filtered first image 1725, and the deblocking-filtered first image 1725 is AI encoded (indicated by 1730) and transmitted. In the AI decoding process, AI encoding data including AI data and image data, which are obtained as a result of AI encoding, is received, a second image 1745 is obtained through first decoding 1740, a deblocking filter 1750 according to the filter setting information received from the deblocking prediction 1370 is applied to the second image 1745 to obtain a deblocking-filtered second image 1755, and the deblocking-filtered second image 1755 is AI upscaled (indicated by 1760) to obtain a third image 1765.

Figure 18:
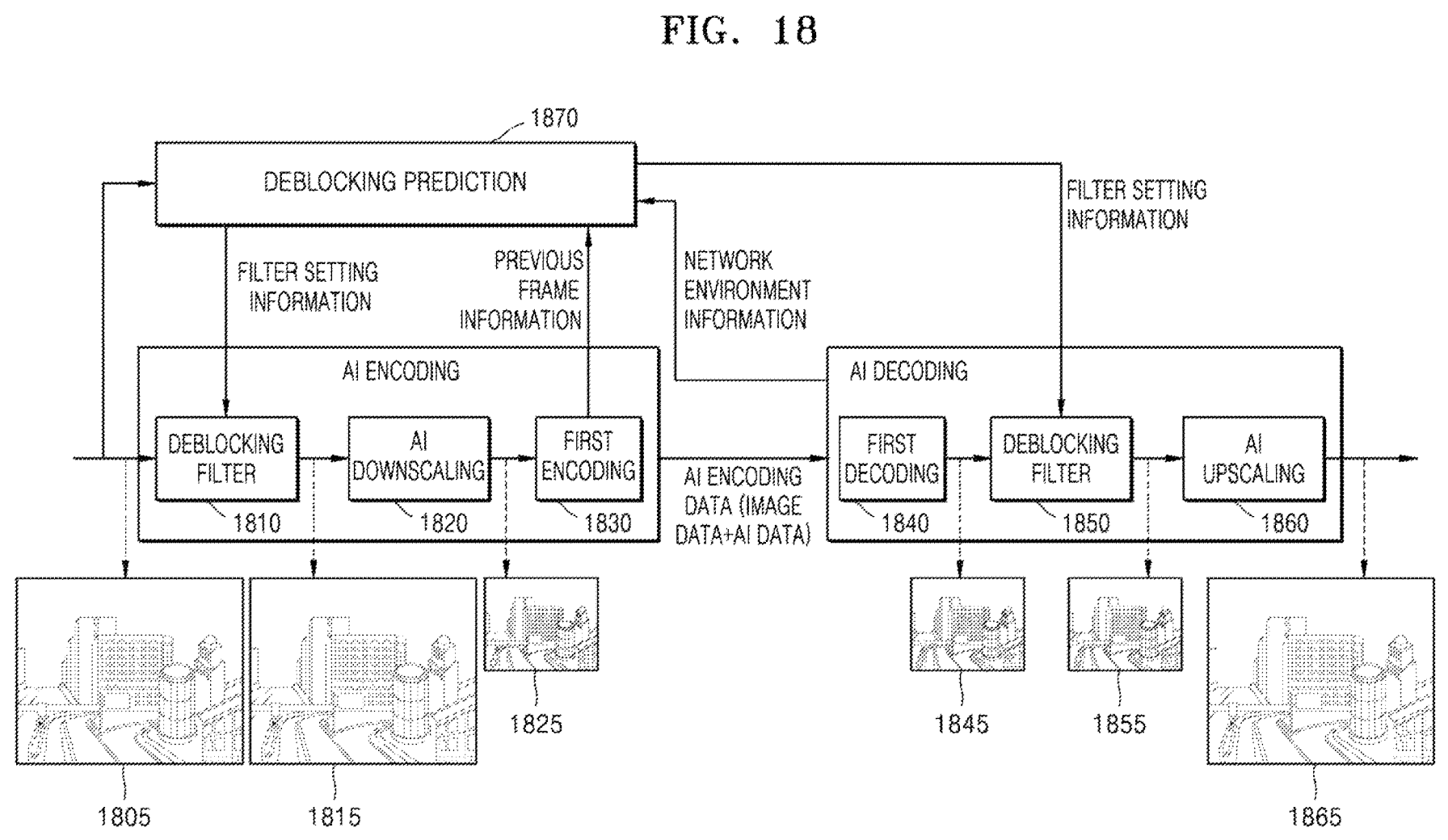

FIG. 18 is a diagram for describing an AI encoding process and an AI decoding process in which deblocking filtering is adaptively added, according to another embodiment.

FIG. 18 illustrates an embodiment in which the position of a deblocking filter in an AI decoding process is changed compared to the AI encoding process and the AI decoding process in which deblocking filtering is adaptively added in FIG. 13.

Referring to FIG. 18, in a deblocking prediction 1870, network environment information of a current streaming channel, an original image 1805, and information of a previously-encoded frame are obtained to predict whether a blocking phenomenon is to occur in an input original image, and filter setting information, such as a blocking area map for areas where blocks are generated, is transmitted when AI encoding and AI decoding are performed. In the AI encoding process, a deblocking-filtered original image 1815 undergoes AI downscaling 1820 by applying a deblocking filter 1810 to the original image 1805, based on filter setting information obtained in the deblocking prediction 1870, to obtain a first image 1825, and the first image 1825 is AI encoded (indicated by 1830) and transmitted. In the AI decoding process, AI encoding data including AI data and image data, which are obtained as a result of AI encoding, is received, a second image 1845 is obtained through first decoding 1840, a deblocking filter 1850 according to the filter setting information received from the deblocking prediction 1870 is applied to the second image 1845 to obtain a deblocking-filtered second image 1855, and the deblocking-filtered second image 1855 is AI upscaled (indicated by 1860) to obtain a third image 1865.

A DNN for deblocking filtering when the deblocking filtering of FIG. 13 is not a legacy deblocking filter but an AI deblocking filter trained with a DNN will now be described.

Figure 19:
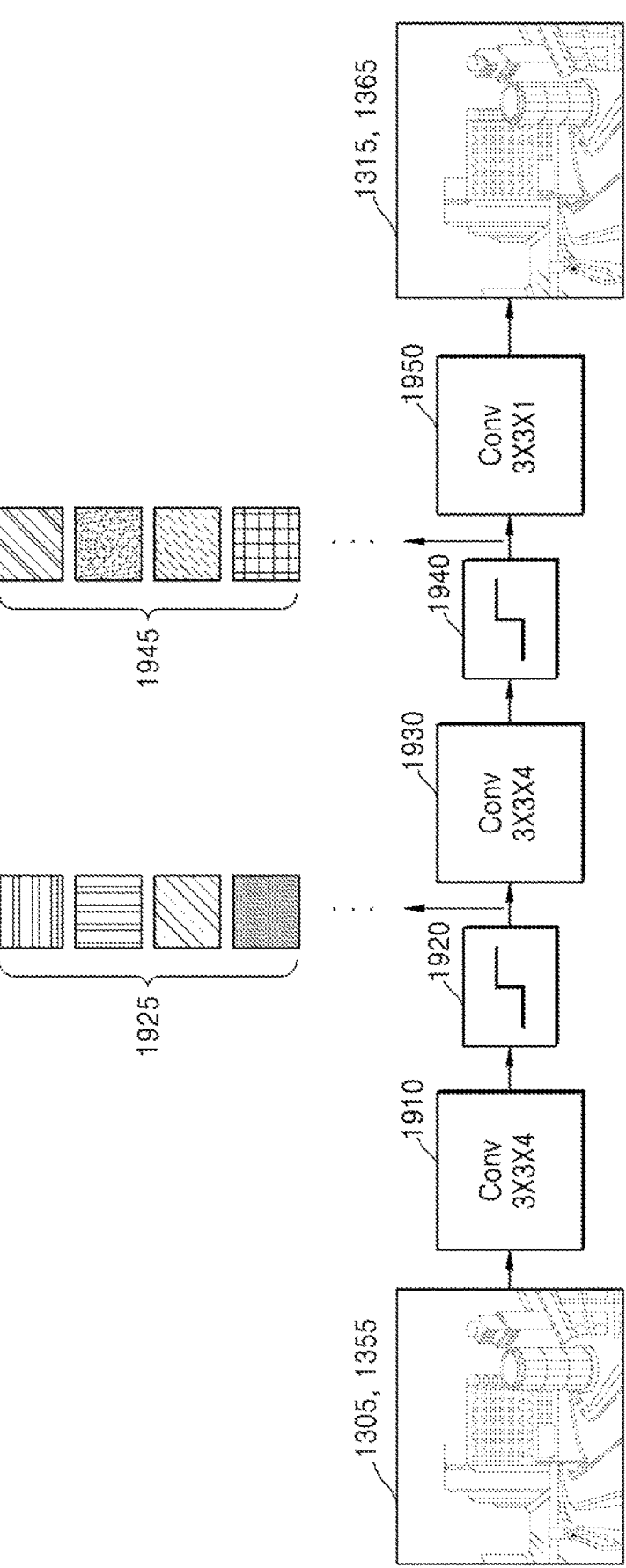
FIG. 19 is a diagram illustrating a third DNN and a fourth DNN for a deblocking filter based on AI, according to an embodiment.

FIG. 19 is a diagram illustrating a third DNN and a fourth DNN for a deblocking filter based on AI.

As shown in FIG. 19, the original image 1305 or the upscaled second image 1355 is input to a first convolutional layer 1910. The first convolutional layer 1910 performs a convolution process on the original image 1305 or the upscaled second image 1355 by using 4 filter kernels each having a size of 5×5. Four feature maps are created as a result of the convolution process. Each feature map represents unique characteristics of the original image 1305 or the upscaled second image 1355. For example, each feature map may represent the vertical direction characteristics, the horizontal direction characteristics, the edge characteristics, or a blocking artifact occurrence probability of the original image 1305 or the upscaled second image 1355. The created four feature maps are input to a first activation layer 1920.

The first activation layer 1920 may impart non-linear characteristics to the four feature maps.

The first activation layer 1920 determines whether to transmit the sample values of the feature maps output by the first convolutional layer 1910 to a second convolutional layer 1930. For example, some of the sample values of the feature maps are activated by the first activation layer 1920 and transmitted to the second convolutional layer 1930, and some sample values are not activated by the first activation layer 1920 and not transmitted to the second convolutional layer 1930. Information represented by the feature maps output from the first convolutional layer 1910 is emphasized by the first activation layer 1920.

An output 1925 of the first activation layer 1920 is input to the second convolutional layer 1930. The second convolutional layer 1930 performs a convolution process on input data by using the four filter kernels each having a size of 3×3. Four feature maps output as a result of the convolution process are input to a second activation layer 1940, and the second activation layer 1940 may impart non-linear characteristics to the 4 feature maps.

An output 1945 of the second activation layer 1940 is input to a third convolutional layer 1950. The third convolutional layer 1950 performs a convolution process on the input data by using one filter kernel having a size of 3×3. As a result of the convolution process, one image may be output from the third convolutional layer 1950. The third convolutional layer 1950, which is a layer for outputting a final image, obtains one output by using one filter kernel. According to an embodiment of the disclosure, the third convolutional layer 1950 may output the deblocking-filtered original image 1315 or the third image 1365 through a convolution operation result.

There may be a plurality of pieces of DNN setting information indicating the numbers of filter kernels of the first, second, and third convolutional layers 1910, 1930, and 1950 of the third or fourth DNN, respective parameters of the filter kernels, and the like.

The plurality of pieces of DNN setting information should be connected to the plurality of pieces of DNN setting information of the fourth DNN. The connection between the plurality of pieces of DNN setting information of the third DNN and the plurality of pieces of DNN setting information of the fourth DNN may be realized via joint training of the third DNN and the fourth DNN.

FIG. 19 illustrates the third or fourth DNN including the three first, second, and third convolutional layers 1910, 1930, and 1950 and the two first and second activation layers 1920 and 1940, but this is merely an example. In some cases, the number of convolutional layers and the number of activation layers may vary. In some cases, the third or fourth DNN may be implemented as an RNN. This case refers to changing a CNN structure of the third or fourth DNN according to an embodiment of the disclosure to an RNN structure.

According to an embodiment, the deblocking filter unit 1424 or the deblocking filter unit 1511 may include at least one ALU for a convolution operation and an operation of an activation layer. The ALU may be implemented as a processor. For the convolution operation, the ALU may include a multiplier that performs a multiplication operation between the sample values of the original image 1305, the upscaled second image 1355, or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tanh function, or ReLU function, and a comparator that compares a result of the multiplication with a predetermined value to determine whether to transmit the input sample value to the next layer.

A method of jointly training a third DNN 2010 and a fourth DNN 2020 will now be described with reference to FIG. 20. The first DNN 800 and the second DNN 300 used for joint training of the third DNN 2010 and the fourth DNN 2020 are DNNs trained in the manner described above in FIGS. 11 and 12.

Figure 20:
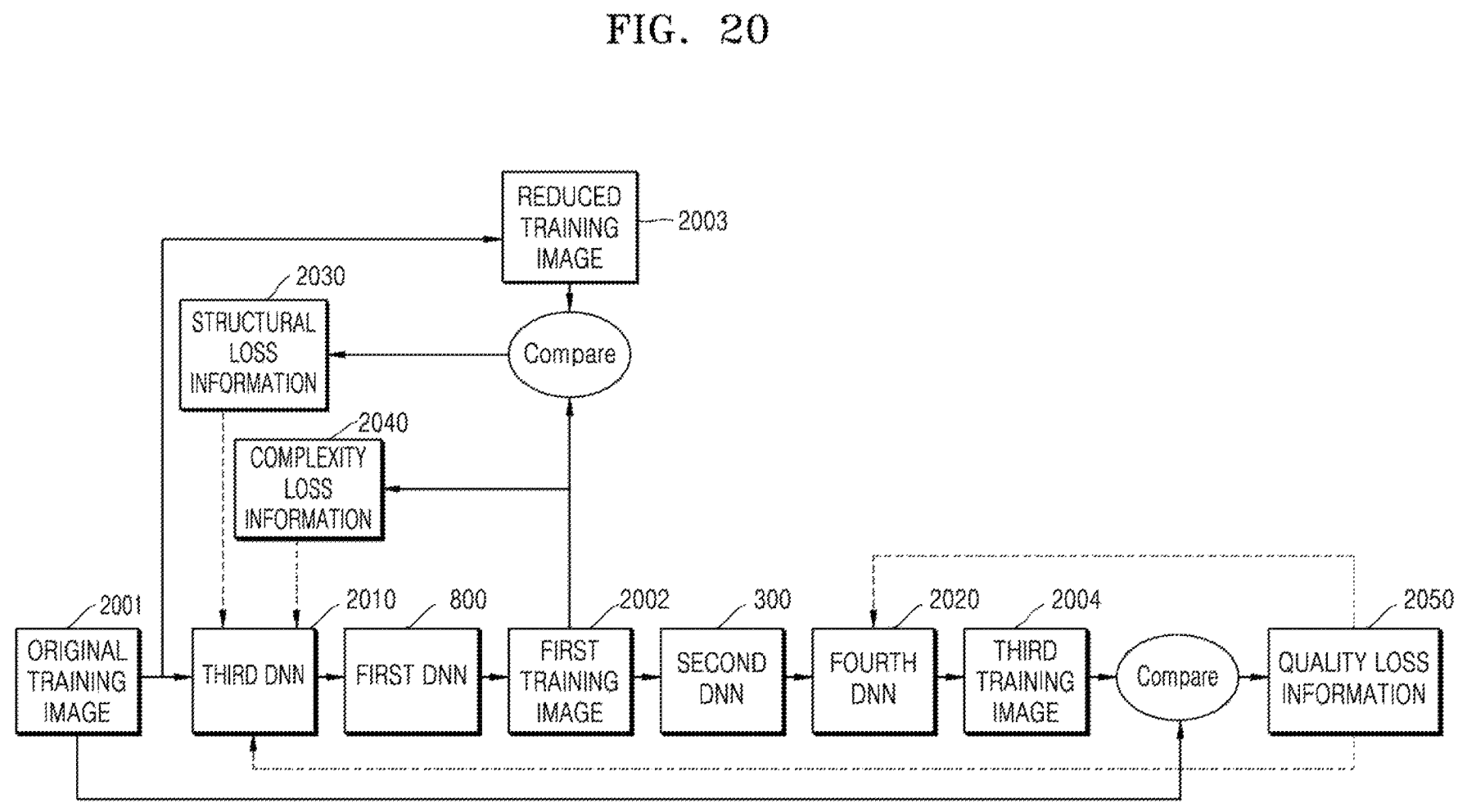

FIG. 20 is a diagram for describing a method of training the third DNN 2010 and the fourth DNN 2020.

According to an embodiment, when there is a change in a streaming environment (when there are many users or there is a change in a communication environment outdoors), the original image 1305, the previous frame information, and the network environment information are obtained through a deblocking prediction process, deblocking filter setting information is transmitted for AI encoding and AI decoding, based on the original image 1305, the previous frame information, and the network environment information. Through an AI encoding process, the original image is deblocking-filtered based on the deblocking filter setting information transmitted through the deblocking prediction process, the AI-downscaled first image 1325 is first-encoded and transmitted, the first-decoded second image 1345 is AI-upscaled, and restored as the deblocking-filtered third image 1365, based on the filter setting information transmitted through the deblocking prediction process.

In the AI encoding and AI decoding processes described above with reference to FIGS. 1 through 12, when the streaming environment is maintained, respective pieces of DNN setting information of the first DNN and the second DNN are selected appropriately for a resolution and a bitrate according to an initial network environment, and an image is transmitted without an additional decoding filter, but, when a problem occurs in the streaming environment, the image may be transmitted while maintaining the quality of image through additional deblocking filters without changing the DNN setting information of the first DNN and the second DNN.

Therefore, the third DNN and the fourth DNN for deblocking filtering are AI downscaled and AI upscaled with respective pieces of DNN setting information of a trained first DNN and a trained second DNN corresponding to a specific resolution and a specific bitrate, and, assuming that the network environment is changed, the third DNN and the fourth DNN are trained under conditions in which the bandwidth or bitrate of a network channel is partially changed.

Accordingly, in order to maintain similarity between the third image 1365 obtained as a result of AI encoding and AI decoding to which deblocking filtering is added and the original image 1305, connectivity between the AI encoding process and the AI decoding process is required. In other words, information lost in the AI encoding process needs to be reconstructed during the AI decoding process, and, to this end, the third DNN 2010 and the fourth DNN 2020 need to be jointly trained.

For accurate deblocking filtering and accurate AI decoding, ultimately, quality loss information 2050 corresponding to a result of comparing a third training image 2004 and an original training image 2001 shown in FIG. 20 needs to be reduced. Accordingly, the quality loss information 2050 is used to train both of the third DNN 2010 and the fourth DNN 2020.

First, a training process shown in FIG. 20 will be described.

In FIG. 20, the original training image 2001 is an image on which deblocking filtering and AI down-scaling are to be performed, and a first training image 2002 is an image obtained by performing deblocking filtering and AI down-scaling on the original training image 1101. A third training image 2004 is an image obtained by performing AI up-scaling and deblocking filtering on the first training image 2002.

The original training image 2001 includes a still image or a moving image including a plurality of frames. According to an embodiment, the original training image 2001 may include a luminance image extracted from the still image or the moving image including the plurality of frames. According to an embodiment, the original training image 2001 may include a patch image extracted from the still image or the moving image including the plurality of frames. When the original training image 2001 includes the plurality of frames, the first training image 2002, a second training image, and the third training image 2004 also each include a plurality of frames. When the plurality of frames of the original training image 2001 are sequentially input to the third DNN 2010 and the trained first DNN 800, the plurality of frames of the first training image 2002, the second training image, and the third training image 2004 may be sequentially obtained through the third DNN 2010, the trained first DNN 800, the trained second DNN 300, and the fourth DNN 2020.

For joint training of the third DNN 2010 and the fourth DNN 2020, the original training image 2001 is input to the third DNN 2010 and the trained first DNN 800. The original training image 2001 input to the third DNN 2010 and the trained first DNN 800 is output as the first training image 2002 via the deblocking filtering and the AI down-scaling, and the first training image 2002 is input to the second DNN 300 and the fourth DNN 2020. The third training image 2004 is output as a result of performing the AI up-scaling and the deblocking filtering on the first training image 2002.

Referring to FIG. 20, the first training image 2002 is input to the trained second DNN 300. In some cases, the second training image obtained as first encoding and first decoding are performed on the first training image 2002 may be input to the trained second DNN 300. The second training image may be input to the second DNN 300 by using any one codec among MPEG-2, H.264, MPEG-4, HEVC, VC-1, VP8, VP9, and AV1. In detail, any one codec among MPEG-2, H.264, MPEG-4, HEVC, VC-1, VP8, VP9, and AV1 may be used to perform first encoding on the first training image 2002 and first decoding on image data corresponding to the first training image 2002.

Referring to FIG. 20, separate from the first training image 2002 being output through the third DNN 2010 and the trained first DNN 800, a reduced training image 2003 obtained by performing legacy down-scaling on the original training image 2001 is obtained. The legacy down-scaling may include at least one of bilinear scaling, bicubic scaling, lanczos scaling, or stair step scaling.

In order to prevent a structural feature of the first image 1325 from deviating greatly from a structural feature of the original image 1305, the reduced training image 2003 is obtained to preserve the structural feature of the original training image 2001.

Before training is performed, the third DNN 2010 and the fourth DNN 2020 may be set to pre-determined DNN setting information. When the training is performed, structural loss information 2030, complexity loss information 2040, and the quality loss information 2050 may be determined.

The structural loss information 2030 may be determined based on a result of comparing the reduced training image 2003 and the first training image 1102. For example, the structural loss information 2030 may correspond to a difference between structural information of the reduced training image 2003 and structural information of the first training image 2002. Structural information may include various features extractable from an image, such as luminance, contrast, histogram, or the like of the image. The structural loss information 2030 indicates how much structural information of the original training image 2001 is maintained in the first training image 2002. When the structural loss information 2030 is small, the structural information of the first training image 2002 is similar to the structural information of the original training image 2001.

The complexity loss information 2040 may be determined based on spatial complexity of the first training image 2002. For example, a total variance value of the first training image 2002 may be used as the spatial complexity. The complexity loss information 2040 is related to a bitrate of image data obtained by performing first encoding on the first training image 2002. It is defined that the bitrate of the image data is low when the complexity loss information 2040 is small.

The quality loss information 2050 may be determined based on a result of comparing the original training image 2001 and the third training image 2004. The quality loss information 2050 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 2001 and the third training image 2004. The quality loss information 2050 indicates how similar the third training image 2004 is to the original training image 2001. The third training image 2004 is more similar to the original training image 2001 when the quality loss information 2050 is small.

Referring to FIG. 20, the structural loss information 2030, the complexity loss information 2040 and the quality loss information 2050 are used to train the third DNN 2010, and the quality loss information 2050 is used to train the fourth DNN 2020. In other words, the quality loss information 2050 is used to train both the third and fourth DNNs 2010 and 2020.

The third DNN 2010 may update a parameter such that final loss information determined based on the structural loss information 2030, the complexity loss information 2040, and the quality loss information 2050 is reduced or minimized. The fourth DNN 2020 may update a parameter such that the quality loss information 2050 is reduced or minimized.

The final loss information for training the third DNN 2010 and the fourth DNN 2020 may be determined as Equation 3 and Equation 4 below.

$$\text{LossDDS}=e*\text{Structural loss information}+f*\text{Complexity loss information}+g*\text{Quality loss information} \qquad \text{(Equation 3)}$$

$$\text{LossDUS}=h*\text{Quality loss information} \qquad \text{(Equation 4)}$$

In Equation 3 and Equation 4, LossDDS indicates final loss information to be reduced or minimized to train the third DNN 2010, and LossDUS indicates final loss information to be reduced or minimized to train the fourth DNN 2020. In Equation 3 and Equation 4, e, f, g, and h may be pre-determined certain weights.

In other words, the third DNN 2010 updates parameters in a direction in which LossDDS of Equation 3 is reduced, and the fourth DNN 2020 updates parameters in a direction in which LossDUS of Equation 4 is reduced. When the parameters of the third DNN 2010 are updated according to LossDDS derived during the training, the first training image 2002 obtained based on the updated parameters becomes different from a first training image 2002 in a previous training process, and accordingly, the third training image 2004 also becomes different from a third training image 2004 in a previous training process. When the third training image 2004 becomes different from the third training image 2004 in the previous training process, the quality loss information 2050 is also newly determined, and the fourth DNN 2020 updates the parameters accordingly. When the quality loss information 2050 is newly determined, LossDDS is also newly determined, and the third DNN 2010 updates the parameters according to newly determined LossDDS. In other words, updating of the parameters of the third DNN 2010 leads to updating of the parameters of the fourth DNN 2020, and updating of the parameters of the fourth DNN 2020 leads to updating of the parameters of the third DNN 2010. In other words, because the third DNN 2010 and the fourth DNN 2020 are jointly trained by sharing the quality loss information 2050, the parameters of the third DNN 2010 and the parameters of the fourth DNN 2020 may be jointly optimized.

Referring to Equation 3 and Equation 4, it is verified that LossDUS is determined according to the quality loss information 2050, but this is only an example, and LossDUS may be determined based on the quality loss information 2050 and at least one of the structural loss information 2030 or the complexity loss information 2040.

It has been described above that the deblocking predictor 1430 of the AI decoding apparatus 1400 and the deblocking predictor 1530 of the AI encoding apparatus 1500 store filter setting information. The filter setting information may include a plurality of pieces of DNN setting information. A method of training each of the plurality of pieces of DNN setting information stored in the deblocking predictor 1430 and the deblocking predictor 1530 will now be described.

As described above with reference to Equation 3 and Equation 4, the third DNN 2010 updates the parameters considering the similarity (structural loss information 2030) between the structural information of the first training image 2002 and the structural information of the original training image 2001, the bitrate (complexity loss information 2040) of the image data obtained as a result of performing first encoding on the first training image 2002, and the difference (quality loss information 2050) between the third training image 2004 and the original training image 2001.

In detail, the parameters of the first DNN 2010 may be updated such that the first training image 2002 having similar structural information as the original training image 2001 is obtained and the image data having a small bitrate is obtained when first encoding is performed on the first training image 2002, and at the same time, the parameters of the third DNN 2010 may be updated so that the fourth DNN 2020 performing AI up-scaling on the first training image 2002 obtains the third training image 2004 similar to the original training image 2001.

A direction in which the parameters of the third DNN 2010 are optimized varies by adjusting the weights e, f, and g of Equation 3 and Equation 4. For example, when the weight f is determined to be high, the parameters of the third DNN 2010 may be updated by prioritizing a low bitrate over a high quality of the third training image 2004. When the weight g is determined to be high, the parameters of the third DNN 2010 may be updated by prioritizing the high quality of the third training image 2004 over a high bitrate or maintenance of the structural information of the original training image 2001.

The direction in which the parameters of the third DNN 2010 are optimized may vary according to a type of codec used to perform first encoding on the first training image 2002, because the second training image to be input to the fourth DNN 2020 may vary according to the type of codec.

In other words, the parameters of the third DNN 2010 and the parameters of the fourth DNN 2020 may be jointly updated based on the weights e, f, and g, and the type of codec for performing first encoding on the first training image 2002. Accordingly, when the third DNN 2010 and the fourth DNN 2020 are trained after determining the weights e, f, and g as certain values, respectively, and determining the type of codec as a certain type, the parameters of the third DNN 2010 and the parameters of the fourth DNN 2020 connected and optimized to each other may be determined.

When the third DNN 2010 and the fourth DNN 2020 are trained after changing the weights e, f, and g, and the type of codec, the parameters of the third DNN 2010 and the parameters of the fourth DNN 2020 connected and optimized to each other may be determined. In other words, the plurality of pieces of DNN setting information jointly trained with each other may be determined in the third DNN 2010 and the fourth DNN 2020 when the third DNN 2010 and the fourth DNN 2020 are trained while changing values of the weights e, f, and g, and the type of codec.

Figure 21:
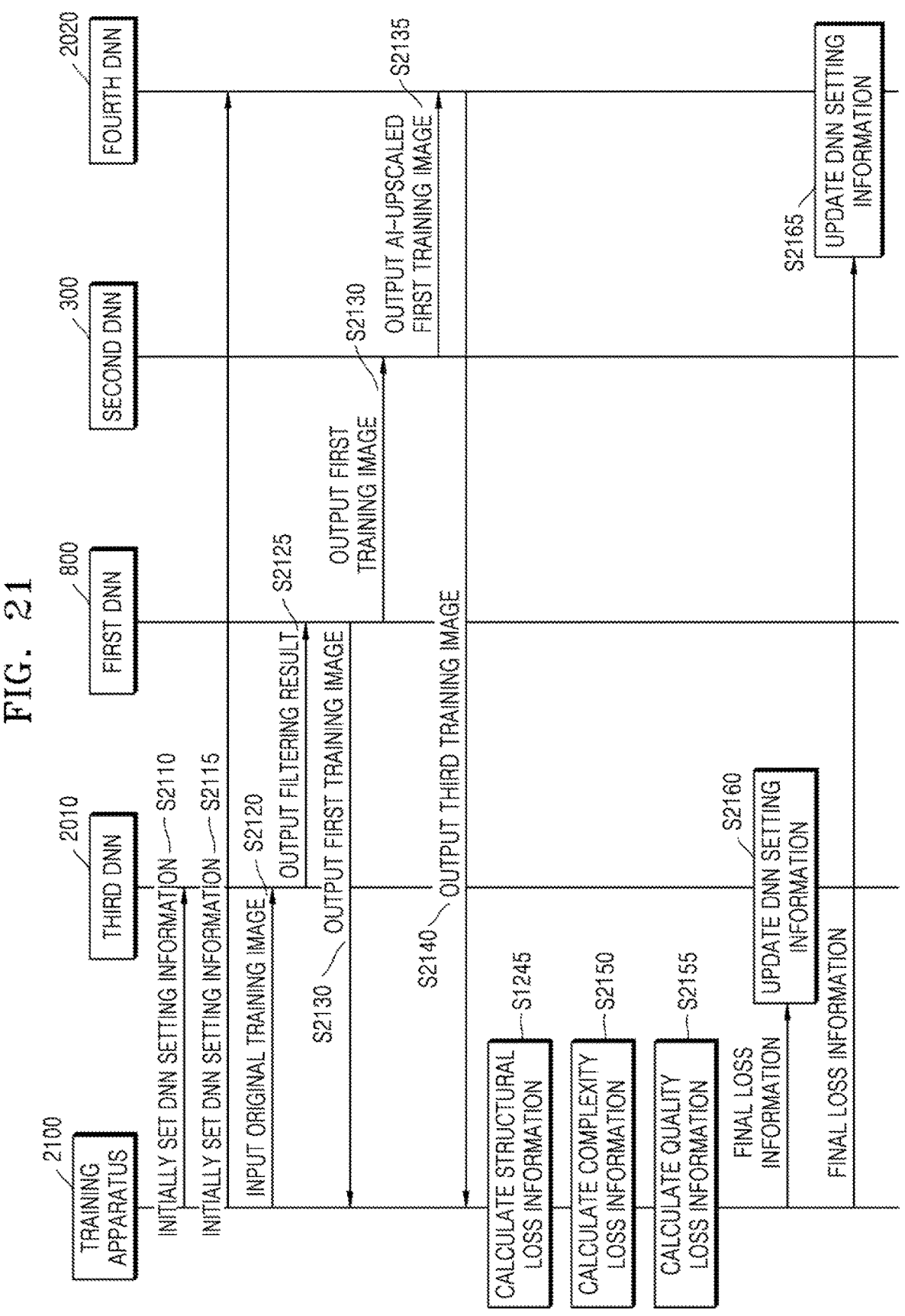
FIG. 21 is a diagram for describing training processes of the third DNN 2010 and the fourth DNN 2020 by a training apparatus 2100, according to an embodiment.

FIG. 21 is a diagram for describing training processes of the third DNN 2010 and the fourth DNN 2020 by a training apparatus 2100.

The training of the third DNN 2010 and the fourth DNN 2020 described above with reference to FIG. 20 may be performed by the training apparatus 2100. The training apparatus 2100 includes the third DNN 2010, the fourth DNN 2020, the trained first DNN 800, and the trained second DNN 300. The training apparatus 2100 may be, for example, the AI encoding apparatus 1500 or a separate server. The pieces of DNN setting information of the fourth DNN 2020 obtained as the training result are stored in the AI decoding apparatus 1400.

Referring to FIG. 21, the training apparatus 2100 initially sets the DNN setting information of the third DNN 2010 and the DNN setting information of the fourth DNN 2020, in operations S2110 and S2115, respectively. Accordingly, the third DNN 2010 and the fourth DNN 2020 may operate according to pre-determined DNN setting information. The DNN setting information may include information about at least one of the numbers of convolutional layers included in the third DNN 2010 and the fourth DNN 2020, the number of filter kernels for each convolutional layer, the size of a filter kernel for each convolutional layer, or a parameter of each filter kernel.

The training apparatus 2100 inputs the original training image 2001 to the third DNN 2010, in operation S2120. The original training image 1101 may include a still image or at least one frame included in a moving image. A filtering result is output by the third DNN 2010 and input to a trained first DNN, in operation S2125.

The third DNN 2010 processes the original training image 2001 according to initially set DNN setting information, and outputs the first training image 2002 obtained by performing deblocking filtering on the original training image 2001 and AI down-scaling on the original training image 2001 through a trained first DNN 800, in operation S2130. In FIG. 21, the first training image 2002 output by the third DNN 2010 and the trained first DNN 800 is directly input to the trained second DNN 300. However, the first training image 2002 output by the third DNN 2010 and the trained first DNN 800 may be input to the second DNN 300 trained by the training apparatus 2100. The training apparatus 2100 may perform first encoding and first decoding on the first training image 2002 via a certain codec, and then input the second training image to the trained second DNN 300.

The trained second DNN 300 performs AI upscaling on the first training image 2002 or the second training image, in operation S2135, and outputs the third training image 2004 obtained by performing deblocking filtering on the first training image 2002 or the second training image, in operation S2140.

The training apparatus 2100 calculates the complexity loss information 2040, based on the first training image 2002, in operation S2145.

The training apparatus 2100 calculates the structural loss information 2030 by comparing the reduced training image 2003 with the first training image 2002, in operation S2150.

The training apparatus 2100 calculates the quality loss information 2050 by comparing the original training image 2001 with the third training image 2004, in operation S2155.

The third DNN 2010 updates the initially set DNN setting information via a back propagation process based on the final loss information, in operation S2160. The training apparatus 2100 may calculate the final loss information for training the third DNN 2010, based on the complexity loss information 2040, the structural loss information 2030, and the quality loss information 2050.

The fourth DNN 2020 updates the initially set DNN setting information via a back propagation process based on the quality loss information 2050 or the final loss information, in operation S2165. The training apparatus 2100 may calculate the final loss information for training the fourth DNN 2020, based on the quality loss information 2050.

Then, the training apparatus 2100, the third DNN 2010, and the fourth DNN 2020 update the DNN setting information by repeating operations S2110 through S2165 until the final loss information is minimized. At this time, during each repetition, the third DNN 2010 and the fourth DNN 2020 operate according to the DNN setting information updated in a previous operation.

FIG. 22 is a flowchart of an AI encoding method according to an embodiment.

In operation S2210, the AI encoding apparatus 1500 obtains an original image, previously encoded frame information, and network environment information.

According to an embodiment, the previously encoded frame information may indicate whether a block artifact of an encoded previous frame is detected.

According to an embodiment, the network environment information may indicate a change in at least one of the bitrate and the bandwidth of a network channel.

In operation S2220, the AI encoding apparatus 1500 obtains deblocking filter setting information, based on the original image, the previously encoded frame information, and the network environment information.

According to an embodiment, when the network environment information indicates that there is no change in the network environment, the deblocking filter setting information may not be obtained, and deblocking filtering may not be performed. In detail, deblocking filtering does not need to be additionally performed, because a blocking phenomenon in which the quality of image is deteriorated does not occur in a normal situation other than when several people simultaneously access or there is a change in the network channel outdoors.

According to an embodiment, the deblocking filter setting information may include a blocking area map representing areas where blocking artifacts occur. In detail, as described above with reference to FIG. 13, the blocking area map may be determined through a weighted average of the A through G score maps.

In operation S2230, the AI encoding apparatus 1500 applies deblocking filtering to the original image, based on the deblocking filter setting information, and obtains an AI-downscaled first image through a downscaling DNN.

According to an embodiment, deblocking filtering in AI encoding may be filtering for redistributing a bit allotment, based on the deblocking filter setting information. In detail, a deblocking filter may redistribute the bit allotment by reducing the number of bits by blurring a complex and fast-moving area of an image and distributing the reduced number of bits to a simple area so that the blocking phenomenon in the simple area is less noticeable.

In operation S2240, the AI encoding apparatus 1500 may perform first encoding on the first image to generate image data.

In operation S2250, the AI encoding apparatus 1500 transmits the deblocking filter setting information, AI data including information related to the AI downscaling, and the image data.

FIG. 23 is a flowchart of an AI decoding method according to an embodiment.

In operation S2310, the AI decoding apparatus 1400 obtains image data generated as a result of first encoding on a first image, AI data related to AI downscaling from an original image to the first image, and deblocking filter setting information.

According to an embodiment, when the deblocking filter setting information is not obtained, deblocking filtering may not be performed. In detail, deblocking filtering does not need to be additionally performed, because the deblocking filter setting information not being obtained means a normal situation other than a case where a deblocking filter needs to be applied, namely, when several people simultaneously access or there is a change in the network channel outdoors.

According to an embodiment, the deblocking filter setting information may include a blocking area map representing areas where blocking artifacts occur. In detail, as described above with reference to FIG. 13, the blocking area map may be determined through a weighted average of the A through G score maps.

In operation S2320, the AI decoding apparatus 1400 performs first decoding on the image data to obtain a second image corresponding to the first image.

In operation S2330, the AI decoding apparatus 1400 obtains DNN setting information for performing AI upscaling on the second image, among a plurality of pieces of DNN setting information, based on the AI data.

In operation S2340, the AI decoding apparatus 1400 generates a reconstructed image by applying AI upscaling to the second image through an upscaling DNN operating with the obtained DNN setting information and applying blocking filtering to the second image, based on the deblocking filter.

According to an embodiment, deblocking filtering in AI decoding may be filtering for blurring a boundary between the blocks of an image and removing a blocking artifact, based on the deblocking filter setting information. In detail, the deblocking filter may perform deblocking filtering in accordance with each area by blurring the boundary between the blocks of the image and removing the blocking artifact.

The above-described embodiments of the disclosure can be written as computer-executable programs or instructions, and the written computer-executable programs or instructions can be stored in a medium.

The medium may continuously store the computer-executable programs or instructions, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a ROM, a random-access memory (RAM), and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 1400 or AI encoding apparatus 1500 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software. For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

What is claimed is:

1. An artificial intelligence (AI) encoding apparatus comprising:

a memory configured to store instructions; and at least one processor configured to execute the instructions to:

obtain an original image, previously-encoded frame information, and network environment information;

obtain deblocking filter setting information, based on the original image, the previously-encoded frame information, and the network environment information;

perform deblocking filtering to the original image, based on the deblocking filter setting information to obtain a deblocking-filtered original image;

obtain an AI-downscaled first image by providing the deblocking-filtered original image to a downscaling deep neural network (DNN);

obtain a quantization parameter differential value map and information about rate control based on the original image, the previously-encoded frame information, and the network environment information;

generate image data by performing first encoding on the AI-downscaled first image based on the quantization parameter differential value map and the information about the rate control; and transmit the deblocking filter setting information, AI data including information related to the AI downscaling, and the image data.

2. The AI encoding apparatus of claim 1, wherein the deblocking filter setting information comprises a blocking area map which represents areas where blocking artifacts occur.

3. The AI encoding apparatus of claim 2, wherein the blocking area map is determined based on at least one of a complexity of the original image and a movement change degree of the original image.

4. The AI encoding apparatus of claim 1, wherein the deblocking filtering is used to redistribute a bit allotment, based on the deblocking filter setting information.

5. The AI encoding apparatus of claim 1, wherein DNN setting information of the downscaling DNN is obtained based on joint training between the downscaling DNN and an upscaling DNN for performing AI upscaling based on the image data.

6. The AI encoding apparatus of claim 1, wherein, based on the network environment information indicating that there is no change in a network environment, the deblocking filter setting information is not obtained, and the deblocking filtering is not performed.

7. The AI encoding apparatus of claim 1, wherein the network environment information indicates a change in at least one of a bitrate of a network channel and a bandwidth of the network channel.

8. The AI encoding apparatus of claim 1, wherein the previously-encoded frame information indicates whether a blocking artifact of an encoded previous frame is detected.

9. An artificial intelligence (AI) encoding method performed by an AI encoding apparatus, the AI encoding method comprising:

obtaining an original image, previously-encoded frame information, and network environment information;

obtaining deblocking filter setting information, based on the original image, the previously-encoded frame information, and the network environment information;

applying deblocking filtering to the original image, based on the deblocking filter setting information, to obtain a deblocking-filtered original image;

obtaining an AI-downscaled first image by providing the deblocking-filtered original image to a downscaling deep neural network (DNN);

obtain a quantization parameter differential value map and information about rate control based on the original image, the previously-encoded frame information, and the network environment information;

generating image data by performing first encoding on the AI-downscaled first image based on the quantization parameter differential value map and the information about the rate control; and transmitting the deblocking filter setting information, AI data including information related to the AI downscaling, and the image data.

* * * * *